(12) United States Patent
Friesen et al.

(10) Patent No.: US 11,160,223 B2
(45) Date of Patent: Nov. 2, 2021

(54) SYSTEMS FOR GENERATING WATER FOR A CONTAINER FARM AND RELATED METHODS THEREFOR

(71) Applicant: Zero Mass Water, Inc., Scottsdale, AZ (US)

(72) Inventors: Cody Alden Friesen, Fort McDowell, AZ (US); Jason Larmour Hooper, Portland, OR (US)

(73) Assignee: Source Global, PBC, Scottsdale, AZ (US)

( * ) Notice: Subject to any disclaimer, the term of this patent is extended or adjusted under 35 U.S.C. 154(b) by 246 days.

(21) Appl. No.: 16/278,608

(22) Filed: Feb. 18, 2019

(65) Prior Publication Data

US 2019/0254243 A1    Aug. 22, 2019

Related U.S. Application Data

(60) Provisional application No. 62/631,936, filed on Feb. 18, 2018, provisional application No. 62/637,958, filed on Mar. 2, 2018.

(51) Int. Cl.
*A01G 31/02* (2006.01)
*A01G 9/24* (2006.01)
(Continued)

(52) U.S. Cl.
CPC ............... *A01G 31/02* (2013.01); *A01G 9/18* (2013.01); *A01G 9/246* (2013.01); *A01G 9/247* (2013.01);
(Continued)

(58) Field of Classification Search
CPC ........ A01G 31/02; A01G 18/00; A01G 9/249; A01G 9/18; A01G 9/246; A01G 9/247; A01G 2031/006
See application file for complete search history.

(56) References Cited

U.S. PATENT DOCUMENTS 2,138,689 A    11/1938   Altenkirch
2,462,952 A    3/1949    Dunkak
(Continued)

FOREIGN PATENT DOCUMENTS

CN    101589282    11/2009
CN    102042645    5/2011
(Continued)

OTHER PUBLICATIONS

USPTO, Notice of Allowance dated Jun. 19, 2020 in U.S. Appl. No. 15/528,366.
(Continued)

*Primary Examiner* — Timothy D Collins
*Assistant Examiner* — Brittany A Lowery
(74) *Attorney, Agent, or Firm* — Snell & Wilmer L.L.P.

(57) ABSTRACT

Systems and methods of generating water for growing or vitally supporting plants, fungi, and/or aquatic animals are provided herein. The systems include a water generating unit that utilizes process fluid produced by plant transpiration or fungus respiration to generate water. Nutrients may be added to the water through hydroponic and aquaponic systems, then provided back to the plants in a closed loop. The systems may be monitored, optimized, and controlled remotely.

21 Claims, 7 Drawing Sheets

(51) Int. Cl.
*A01G 9/18* (2006.01)
*A01G 18/00* (2018.01)
*A01G 31/00* (2018.01)

(52) U.S. Cl.
CPC ............. *A01G 9/249* (2019.05); *A01G 18/00* (2018.02); *A01G 2031/006* (2013.01)

(56) References Cited

U.S. PATENT DOCUMENTS

| | | |
|---|---|---|
| 2,700,537 A | 1/1955 | Pennington |
| 2,761,292 A | 9/1956 | Coanda et al. |
| 3,400,515 A | 9/1968 | Ackerman |
| 3,740,959 A | 6/1973 | Foss |
| 3,889,532 A | 6/1975 | Pilie et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 5,058,388 A | 10/1991 | Shaw et al. |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,729,981 A | 3/1998 | Markus et al. |
| 5,758,511 A | 6/1998 | Yoho et al. |
| 5,846,296 A | 12/1998 | Krmsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,866,176 B2 | 2/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0202944 A1 | 8/2008 | Santoli et al. |
| 2008/0224652 A1 | 9/2008 | Zhu et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0275629 A1 | 11/2010 | Erickson |
| 2010/0275775 A1 | 11/2010 | Griffiths et al. |
| 2010/0294672 A1 | 11/2010 | Gahr et al. |
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Fllsworth |
| 2011/0247353 A1 | 10/2011 | Metz |
| 2012/0227582 A1 | 9/2012 | Wamstad et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2014/0034475 A1 | 2/2014 | Kamen et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2015/0033774 A1 | 2/2015 | Ferreira et al. |
| 2015/0194926 A1 | 7/2015 | Bushong, Jr. |
| 2016/0073589 A1* | 3/2016 | Mcnamara ............ A01G 18/00 47/1.1 |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0244951 A1 | 8/2016 | Yui |
| 2016/0333553 A1 | 11/2016 | Dorfman |
| 2017/0013810 A1* | 1/2017 | Grabell .................. A01K 63/00 |
| 2017/0024641 A1 | 1/2017 | Wierzynski |
| 2017/0323221 A1 | 11/2017 | Chaudhuri et al. |
| 2017/0354920 A1 | 12/2017 | Friesen et al. |
| 2018/0043295 A1* | 2/2018 | Friesen .................. B01D 53/04 |
| 2019/0025273 A1 | 1/2019 | Brondum |
| 2019/0171967 A1 | 6/2019 | Friesen et al. |
| 2019/0254243 A1 | 8/2019 | Friesen et al. |

(56) References Cited

U.S. PATENT DOCUMENTS

| | | |
|---|---|---|
| 2019/0336907 A1 | 11/2019 | Friesen et al. |
| 2019/0344214 A1 | 11/2019 | Friesen et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0269184 A1 | 8/2020 | Friesen et al. |
| 2020/0283997 A1 | 9/2020 | Salloum et al. |
| 2020/0300128 A1 | 9/2020 | Friesen et al. |

FOREIGN PATENT DOCUMENTS

| | | | |
|---|---|---|---|
| CN | 102297503 | 12/2011 | |
| CN | 102441320 | 5/2012 | |
| CN | 102733451 | 10/2012 | |
| CN | 202850099 | 4/2013 | |
| CN | 203777907 | 8/2014 | |
| CN | 104813107 | 7/2015 | |
| EP | 1139554 | 10/2001 | |
| EP | 2305362 | 4/2011 | |
| FR | 2813087 | 2/2002 | |
| WO | 2006129200 | 12/2006 | |
| WO | 2007041804 | 4/2007 | |
| WO | 2007051886 | 5/2007 | |
| WO | 2008018071 | 2/2008 | |
| WO | 2012009024 | 1/2012 | |
| WO | 2012128619 | 9/2012 | |
| WO | 2012162760 | 12/2012 | |
| WO | 2013026126 | 2/2013 | |
| WO | 2013182911 | 12/2013 | |
| WO | 2014085860 | 6/2014 | |
| WO | 2015054435 | 4/2015 | |
| WO | 2016053162 | 4/2016 | |
| WO | 2016081863 | 5/2016 | |
| WO | 2016138075 | 9/2016 | |
| WO | WO-2016138075 A1 * | 9/2016 | ............. A01G 31/06 |
| WO | 2016187709 | 12/2016 | |
| WO | 2017177143 | 10/2017 | |
| WO | 2017201405 | 11/2017 | |
| WO | 2019014599 | 1/2019 | |
| WO | 2019050861 | 3/2019 | |
| WO | 2019050866 | 3/2019 | |
| WO | 2019071202 | 4/2019 | |
| WO | 2019113354 | 6/2019 | |
| WO | 2019161339 | 8/2019 | |
| WO | 2020082038 | 4/2020 | |
| WO | 2020086621 | 4/2020 | |

OTHER PUBLICATIONS

International Search Report and Written Opinion dated Jun. 15, 2020 in Application No. PCT/US2020/029401.
Final Office Action dated Oct. 15, 2020 in U.S. Appl. No. 16/791,895.
Final Office Action dated Apr. 27, 2020 in U.S. Appl. No. 15/528,366.
Non-Final Office Action dated Jun. 1, 2020 in U.S. Appl. No. 16/167,295.
Non-Final Office Action dated May 15, 2020 in U.S. Appl. No. 16/791,895.
International Search Report and Written Opinion dated Mar. 19, 2020 in Application No. PCT/US2019/057081.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Aug. 9, 2019 in U.S. Appl. No. 16/517,435.
International Search Report and Written Opinion dated Apr. 29, 2016 in Application No. PCT/US2015/061921.
International Search Report and Written Opinion dated Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018 Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jul. 29, 2019 in Application No. PCT/US2019/32066.
European Search Report dated Jun. 7, 2019 in Application No. 15825979.
Office Action dated Oct. 31, 2019 in Chinese Application No. 201780033378.3.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys. vol. 10, pp. 11519-11533 (2010).
European Solar Thermal Industry Federation (ESTIF), "Key Issues for Renewable Heat in Europe (K4RES-H)," Solar Assisted Cooling-WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al., "Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
PCT; International Search Report and Written Opinion dated Jun. 6, 2019 in Application No. PCT/US2019/018431.

* cited by examiner

SYSTEMS FOR GENERATING WATER FOR A CONTAINER FARM AND RELATED METHODS THEREFOR

CROSS-REFERENCE TO RELATED APPLICATIONS

This application claims the benefit of priority to U.S. Provisional Patent Application No. 62/631,936, titled SYSTEMS FOR GENERATING WATER FOR A SHIPPING CONTAINER FARM AND RELATED METHODS THEREFOR and filed Feb. 18, 2018, and U.S. Provisional Patent Application No. 62/637,958, titled SYSTEMS FOR GENERATING WATER FOR A SHIPPING CONTAINER FARM AND RELATED METHODS THEREFOR and filed on Mar. 2, 2018, each of which are hereby incorporated by reference in their entirety.

BACKGROUND

Container farming is a growing industry for generating produce in an artificial environment. This type of farming system provides many advantages, such as easy transportability, low costs, and reduced impact from the surrounding environment and climate. However, these advantages decrease when a continuous water source is not readily available. Providing a continuous water source to container farms poses a logistical and environmental challenge, particularly where the container farm is located remotely from a natural liquid water source or utility infrastructure.

Additionally, controlling the environment within a relatively small, enclosed space is challenging, especially as plant density increases. Factors to consider are the continuous generation of heat from the lights, evaporation of water, transpiration of the plants, accumulation of gasses, etc. For example, the lighting requirements for optimal plant growth may generate more heat than is tolerable for plant survival. Additionally, the constant transpiration of the plants may generate high humidity within the container, thereby leading to impaired root development, and reduced water and nutrient uptake. Therefore, improved systems are needed for maintaining a container environment that is optimal for plant growth.

Provided herein are container farming systems and methods for generating water using the humidity generated by the growth of plants and/or fungi in a closed loop. The farming systems may further utilize hydroponic and aquaponic techniques for cycling water and nutrients through the system. Additionally, the container environment may be continuously monitored, optimized, and controlled remotely.

SUMMARY OF INVENTION

This disclosure includes embodiments of systems and methods of generating water in a container farm.

In various embodiments, a farming system comprises growing station coupled to a water generating unit and configured to grow or vitally support at least one of plants and fungi. In various embodiments, the water generating unit comprises a desiccation device comprising a desiccant and a housing, wherein the housing defines an adsorption zone and a desorption zone, a heat generator coupled to the desiccation device, a condenser coupled to the desiccation device and to the heat generator, a blower configured to receive a process fluid and move the process fluid to the adsorption zone of the desiccation device a circulator configured to receive a regeneration fluid and operably move and repeatedly cycle the regeneration fluid from the heat generator to the desorption zone of the desiccation device to the condenser, and back to the heat generator, and an actuator configured to operably move and repeatedly cycle the desiccant, or portions thereof, between the adsorption zone and desorption zone to capture water from the process fluid received at the adsorption zone and to desorb water into the regeneration fluid received at the desorption zone.

In various embodiments, at least a portion of the process fluid is generated by the at least one of plants and fungi. In various embodiments, the regeneration fluid comprises at least one of humid air, one or more supersaturated gases, one or more glycols, and one or more ionic liquids. In various embodiments, the condenser transfers thermal energy extracted from the regeneration fluid to at least one of the process fluid and an atmosphere around the water generating unit.

In various embodiments, the farming system further comprises at least one solar panel, the solar panel comprising the heat generator and at least one photovoltaic cell configured to generate electricity. In various embodiments, the farming system further comprises a water generating unit control system configured to control one or more of: a speed at which the blower moves the process fluids, a speed at which the circulator moves the regeneration fluid, and a speed at which the actuator moves the desiccant element.

In various embodiments, the water generating unit control system communicates with one or more sensors configured to detect one or more of: an ambient air temperature at the water generating unit, an ambient air relative humidity at the water generating unit, a temperature of the heat generated by the heat generator, a rate of flow of the heat generated by the heat generator, and a relative humidity of the process fluid. In various embodiments, the water generating unit control system employs a control algorithm configured to determine optimal control conditions for one or more of the blower, the circulator, and the actuator, relative to each other, as a function of one or more of an ambient air temperature at the water generating unit, a temperature of the process fluid, a relative humidity of the process fluid, a temperature of the heat generated by the heat generator, and a rate of flow of the heat generated by the heat generator.

In various embodiments, a farming system comprises a growing station configured to grow or vitally support at least one of plants and fungi, a nutrient supply system in fluid communication with, and configured to supply nutrients to, the growing station, and a lighting system configured to make light available to the at least one of plants and fungi, wherein at least a portion of the farming system is contained within a chamber, and wherein the growing station is in fluid communication with a water generating unit configured to generate water from air disposed inside the chamber.

In various embodiments, the water generating unit is at least partially contained within the chamber. In various embodiments, the growing station comprises at least one of vertically and horizontally stacked nutrient film technique (NFT) channels configured to receive nutrient dense water from the nutrient supply system and distribute the nutrient dense water to the at least one of plants and fungi. In various embodiments, the NFT channels are further configured to distribute nutrient depleted water to the nutrient supply system. In various embodiments, the nutrient supply system comprises at least one of an aquaponics tank and a hydroponics tank, wherein at least a portion of the water held by the aquaponics tank and the hydroponics tank is generated by, and received from, the water generating unit. In various embodiments, the aquaponics tank is configured to grow or vitally support aquatic animals, and wherein at least a portion of the nutrients are produced by the aquatic animals. In various embodiments, the nutrient supply system further comprises one or more nutrient reservoirs configured to hold one or more nutrients and to provide the one or more nutrients to at least one of the aquaponics tank and the hydroponics tank.

In various embodiments, the farming system further comprises at least one of a bio filter and a vortex solids filter configured to filter the water provided by the aquaponics tank. In various embodiments, the water generating unit comprises a desiccation device comprising a housing defining an adsorption zone and a desorption zone, and a desiccant, a heat generator coupled to the desiccation device, a condenser coupled to the desiccation device and to the heat generator, a blower configured to receive a process fluid and move the process fluid to the adsorption zone of the desiccation device, a circulator configured to receive a regeneration fluid and operably move and repeatedly cycle the regeneration fluid from the heat generator to the desorption zone of the desiccation device to the condenser, and back to the heat generator, and an actuator configured to operably move and repeatedly cycle the desiccant, or portions thereof, between the adsorption zone and desorption zone to capture water from the process fluid received at the adsorption zone and desorb water into the regeneration fluid received at the desorption zone.

In various embodiments, water generated by the water generating unit is the only water used to grow or vitally support the plants and fungi. In various embodiments, the process fluid comprises a farm process fluid received from the interior of the chamber. In various embodiments, the water generating unit is configured to use only the farm process fluid to generate water.

In various embodiments, the farming system further comprises a ventilation system configured to provide the farm process fluid to the water generating unit. In various embodiments, the ventilation system is configured to receive all of or a portion of the process fluid exhausted by the water generating unit and return it to the farming system.

In various embodiments, the farming system further comprises a water generating unit control system configured to control one or more of: a speed at which the blower moves the process fluids, a speed at which the circulator moves the regeneration fluid, and a speed at which the actuator moves the desiccant element. In various embodiments, the water generating unit control system communicates with one or more sensors configured to detect one or more of: an ambient air temperature at the water generating unit, an ambient air relative humidity at the water generating unit, a temperature of the heat generated by the heat generator, a rate of flow of the heat generated by the heat generator, and a relative humidity of the farm process fluid. In various embodiments, the water generating unit control system employs a control algorithm configured to determine optimal control conditions for one or more of the blower, the circulator, and the actuator, relative to each other, as a function of one or more of an ambient air temperature at the water generating unit, a temperature of the farm process fluid, a relative humidity of the farm process fluid, a temperature of the heat generated by the heat generator, and a rate of flow of the heat generated by the heat generator.

In various embodiments, the farming system further comprises a farm control system configured to control at least one of the nutrient supply system, the lighting system, and the ventilation system. In various embodiments, the farm control system controls when the growing station receives water from the water generating unit, and a quantity of water received by the growing station from the water generating unit. In various embodiments, the farm control system is configured to monitor and control at least one of an ambient air temperature of the interior of the chamber, an ambient air relative humidity of the interior of the chamber, a water total dissolved solids (TDS)/parts per million (PPM) value of the water made available to the growing station, a potential of hydrogen (pH) value of the water made available to the growing station, and a lighting cycle of the light provided by the lighting system to the growing station.

In various embodiments, the chamber comprises a fungi chamber configured to grow or vitally support fungi, and not configured to grow or vitally support plants, and a plant chamber configured to grow or vitally support fungi, and not configured to grow or vitally support plants, wherein an environment within the fungi chamber and an environment within the plant chamber are at least partially separated. In various embodiments, the process fluid exhausted by the water generating unit is returned to the plant chamber of the farming system, and wherein the ventilation system is further configured to transfer at least some of the $CO_2$ generated by respiration of the fungi to the plant chamber, and to transfer at least some of the $O_2$ generated by transpiration of the plants to the fungi chamber.

In various embodiments, a method of using a farming system comprises generating water, by a water generating unit of the farming system, from a process fluid, adding nutrients, by a nutrient supply system of the farming system, to the water, communicating the water, by a conduit of the farming system, to a growing station, wherein the growing station is configured to grow or vitally support at least one of plants and fungi, and wherein at least one or photosynthesis and respiration by the at least one of plants and fungi is configured to generate a farm process fluid, and communicating the farm process fluid, by a ventilation system of the farming system, to the water generating unit, wherein at least a portion of the farming system is contained within a chamber.

In various embodiments, the process fluid comprises the farm process fluid, and the water generating unit is configured to use only the farm process fluid to generate water. In various embodiments, the method further comprises making available light, by a lighting system of the farming system, to the growing station. In various embodiments, the method further comprises making available carbon dioxide, by a farm control system of the farming system, to the growing station. In various embodiments, the method further comprises communicating nutrient-depleted water, by the conduit, from the growing station to the nutrient supply system. In various embodiments, the method further comprises at least one of mineralizing water, by the water generating unit, and ozonating water, by the water generating unit. In various embodiments, the method further comprises receiving, by the ventilation system, at least a portion of the process fluid exhausted by the water generating unit, and communicating, by the ventilation system, the at least a portion of the process fluid to the chamber.

In various embodiments, the water generating unit is configured to condense a process fluid to generate water, and wherein the process fluid is at least one of an atmospheric process fluid from the atmosphere around the water generating unit and a farm process fluid from the chamber. In various embodiments, the nutrient supply system comprises at least one of an aquaponics tank and a hydroponics tank, and wherein the at least one of the aquaponics tank and the hydroponics tank are configured to receive and hold water generated by the water generating unit. In various embodiments, the water generating unit comprises a desiccation device comprising a housing defining an adsorption zone and a desorption zone, and a desiccant, a heat generator coupled to the desiccation device, a condenser coupled to the desiccation device and to the heat generator, a blower configured to receive a process fluid and move the process fluid to the adsorption zone of the desiccation device, a circulator configured to receive a regeneration fluid and operably move and repeatedly cycle the regeneration fluid from the heat generator to the desorption zone of the desiccation device to the condenser, and back to the heat generator, and an actuator configured to operably move and repeatedly cycle the desiccant, or portions thereof, between the adsorption zone and desorption zone to capture water from the process fluid received at the adsorption zone and desorb water into the regeneration fluid received at the desorption zone.

The foregoing features and elements may be combined in various combinations without exclusivity, unless expressly indicated otherwise. These features and elements as well as the operation thereof will become more apparent in light of the following description and the accompanying drawings. It should be understood; however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the following drawing figures.

Figure 1:
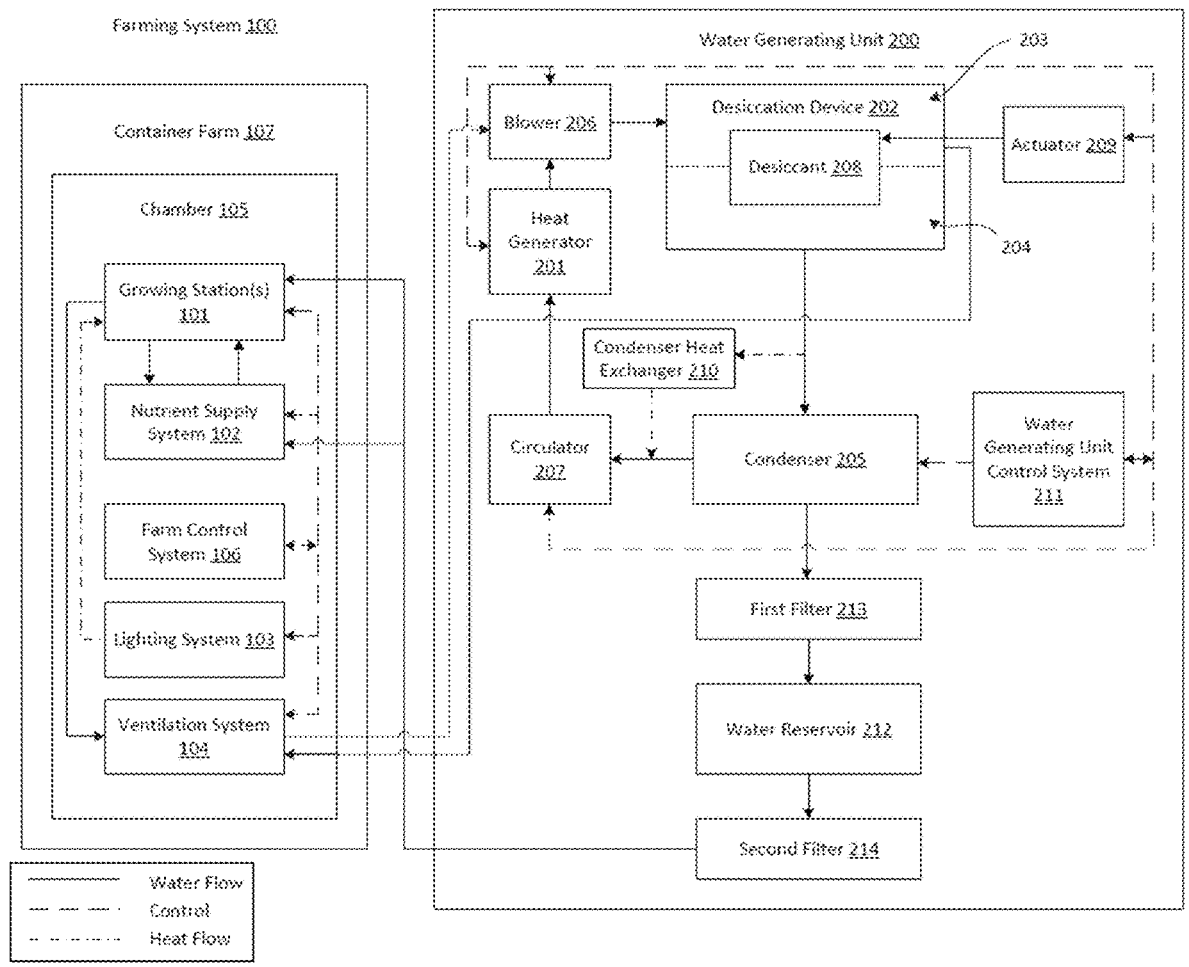
FIG. 1 illustrates a representative block diagram of a farming system, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Referring now to the drawings, and more particularly to FIG. 1, shown therein and designated by the reference numeral 100 is a first embodiment of the present farming system 100. In the embodiment shown, farming system 100 is configured to grow and/or vitally support plants, fungi, and/or aquatic animals in a container farm 107 using water generated by a water generating unit 200. In some embodiments, the water generated by water generating unit 200 is the only water used by farming system 100 to grow and/or vitally support the plants, fungi, and/or aquatic animals.

In various embodiments, container farm 107 comprises one or more growing stations 101, a nutrient supply system 102, a lighting system 103, a carbon dioxide ($CO_2$) system 110, and/or a ventilation system 104, wherein farming system 100 is contained within a chamber 105, and wherein container farm 107 is coupled to water generating unit 200. In various embodiments, water generating unit 200 is contained within chamber 105. In various embodiments, water generating unit 200 is separate from chamber 105. In various embodiments, water generating unit 200 is partially contained within chamber 105.

The interior of chamber 105 may be accessible through a door. In various embodiments, the interior of chamber 105 is insulated and/or sealed from the atmosphere outside of chamber 105 when the door is closed. In various embodiments, chamber 105 is a shipping container. In other embodiments, chamber 105 may be a warehouse, a greenhouse, a hoop house, or any other enclosed or partially-enclosed environment.

In various embodiments, container farm 107 comprises one or more growing station(s) 101, which may be configured to grow and/or vitally support plants (e.g. flowering plants, fruiting plants, vegetables, fruits, flowers, herbs, micro plants (e.g., micro greens, micro fodder, micro roots, micro herbs, etc.), etc.) and/or fungi (e.g. mushrooms, etc.). In various embodiments growing station(s) 101 are configured to grow and/or vitally support high yield plants and/or fungi.

In various embodiments, growing station(s) 101 comprise nutrient film technique (NFT) channels configured to grow and/or vitally support the plants and/or fungi. Nutrient film technique (NFT) channels may be vertically stacked. Nutrient film technique (NFT) channels may be horizontally stacked. In various embodiments, Nutrient film technique (NFT) channels are vertically and horizontally stacked. The vertically and/or horizontally stacked nutrient film technique (NFT) channels may be configured to receive nutrient dense water to make nutrients available to the plants and/or fungi at growing station(s) 101. In various embodiments, the nutrient film technique (NFT) channels receive water from water generating unit 200.

In various embodiments, nutrient supply system 102 communicates and/or makes nutrient dense water available (e.g. in a low volume continuous flow) to nutrient film technique (NFT) channels of growing station(s) 101, which communicates and/or makes nutrients available to the plants (e.g., the plant root zone of the plants) and/or fungi being grown and/or vitally supported by growing station(s) 101. As a result, the plants and/or fungi receive the available nutrients from the nutrient dense water received from nutrient supply system 102. After uptake or absorption of nutrients by the plants and/or fungi, nutrient film technique (NFT) channels of growing station(s) 101 may communicates and/or return the nutrient-depleted water to the nutrient supply system 102, such as, for example, to be used again at the nutrient supply system 102.

Other hydroponics techniques may be used to provide the nutrient dense water to the plants and/or fungi at growing station(s) 101. For example, conventional hydroponics using a medium such as clay pebbles or rock wool, deep water culture hydroponics, ebb and flow hydroponics, aeroponics, etc. may be used. As used in this disclosure, "hydroponics" refers to a technique for growing plants and/or fungi in solutions containing water and nutrients, in the absence of soil. Artificial mediums such as sand, gravel, coir, hydroton grow rocks, perlite, or any other suitable medium are sometimes used to provide mechanical support, and aid in moisture and nutrient retention at growing station(s) 101 or elsewhere in container farm 107. Aeroponics may also be used to provide the nutrient dense water to the plants, through a misting or spraying mechanism at the plant roots.

In various embodiments, nutrient supply system 102 comprises one or more hydroponics tanks 109. In various embodiments, nutrient supply system 102 comprises one or more aquaponics tanks 108. As used in this disclosure, "aquaponics" refers to a hydroponic system that includes the use of aquatic animals as a source of nutrients. The aquatic animals are raised in a tank where their excretions accumulate in the water. The water is then fed to a hydroponic system containing bacteria that convert ammonia and nitrite from the fish waste into nitrates, which can then be utilized by the plants as nutrients.

In various embodiments, nutrient supply system 102 comprises both one or more hydroponics tanks 109 and one or more aquaponics tanks 108. In various embodiments, nutrient supply system 102 comprises one or more nutrient reservoirs, configured to hold one or more nutrients.

In various embodiments, the hydroponics tank(s) 109 is configured to make nutrients available to growing station(s) 101 for use by the plants and/or fungi. The hydroponics tank(s) 109 may be configured to hold water. The water held by the hydroponics tank(s) 109 may be generated by and received from water generating unit 200. Further, the water held by the hydroponics tank(s) 109 may be mixed with nutrients, and then made available to growing station(s) 101 for use by the plants/and or fungi. In various embodiments, water provided to growing station(s) 101 is returned (e.g. recycled) to the hydroponics tank(s) 109. In various embodiments, the nutrients mixed with the water held by the hydroponics tank(s) 109 is provided by the nutrient reservoir of the nutrient supply system 102.

In various embodiments, the aquaponics tank(s) 108 is configured to generate and/or make nutrients available to a nutrient supply system 102 for use by the plants and/or fungi grown and/or vitally supported by the growing station(s) 101. Further, the aquaponics tank(s) 108 may be configured to grow and/or vitally support aquatic animals. For example, the hydroponics tank(s) 109 may be configured to hold water and aquatic animals. The water held by the aquaponics tank(s) 108 may be generated by and received from water generating unit 200. Further, the water held by the aquaponics tank(s) 108 may be mixed with nutrients (e.g. waste generated by the aquatic animal). The nutrient dense water may then be made available by nutrient supply system 102 to growing station(s) 101 for use by the plants and/or fungi.

In various embodiments, water provided to growing station(s) 101 is returned (e.g. recycled) to the aquaponics tank(s) 108.

In various embodiments, the aquatic animals grown and/or vitally supported by the aquaponics tank(s) 108 also serve as food for human or animal consumption. For example, the aquatic animals may include fish, snails, crayfish, prawns, etc. In these embodiments, the aquaponics tank(s) 108 may comprise an aquaponics fish production tank.

In various embodiments, the aquaponics tank(s) 108 comprises a bio filter and/or a vortex solids filter. The bio filter and/or vortex solids filter may be configured to filter the water provided to growing station(s) 101 of farming system 100. The bio filter and vortex solids filter may be configured to filter the water provided by the aquaponics tank(s) 108 to the growing station(s) 101, in order to remove contaminants and/or large particles from the water.

In various embodiments, the hydroponics tank(s) 109 and/or aquaponics tank(s) 108 of the nutrient supply system 102 is contained within chamber 105. In other embodiments, for example, where a larger volume tank is desired, the hydroponics tank(s) 109 and/or aquaponics tank(s) 108 may be disposed outside the chamber and coupled to farming system 100 through any suitable conduits. Using a larger volume tank can permit more aquatic animals to be grown and/or vitally supported by the aquaponics tank(s) 108, which in turn can make available more nutrients to growing station(s) 101. In some embodiments, the hydroponics tank(s) 109 may be smaller in volume than the aquaponics tank(s) 108, or the aquaponics tank(s) 108 may be configured to provide comparable nutrients to growing station. In some embodiments, implementing a hydroponics tank and not an aquaponics tank may permit chamber 105 to be smaller by volume and/or may allow container farm 107 to grow or vitally support more plants and/or fungi.

In various embodiments, growing station(s) 101 may be coupled to nutrient supply system 102 by any suitable conduits configured to transfer water between growing station(s) 101 and nutrient supply system 102. Suitable conduits of farming system 100 may include, but are not limited to, pipes, tubes, channels, tunnels, or any other suitable means of communicating a fluid between two locations. In various embodiments, when nutrient supply system 102 comprises both hydroponics tank(s) 109 and aquaponics tank(s) 108, hydroponics tank(s) 109 and aquaponics tank(s) 108 are both coupled to growing station(s) 101 by conduits arranged in parallel. In other embodiments, when nutrient supply system 102 comprises both hydroponics tank(s) 109 and aquaponics tank(s) 108, the hydroponics tank(s) 109 and the aquaponics tank(s) 108 are both coupled to growing station(s) 101 by the conduits arranged in series, with water from the aquaponics tank(s) 108 flowing to the hydroponics tank(s) 109, to growing station(s) 101, and back to the aquaponics tank(s) 108.

In various embodiments, when nutrient supply system 102 comprises an aquaponics tank 108, the farming system 100 is an aquaponics farming system. In other embodiments, when nutrient supply system 102 omits an aquaponics tank, and comprises a hydroponics tank, the farming system 100 is a hydroponics farming system.

In various embodiments, lighting system 103 may be configured to generate and/or make light available to the plants, fungi, and/or aquatic animals grown and/or vitally supported by the farming system. In various embodiments, the spectrum of the light provided by lighting system 103 is optimized for the particular plants, fungi, and/or aquatic animals being grown and/or vitally supported.

In various embodiments, lighting system 103 of farming system 100 is a lighting system that generates high heat output. In an exemplary embodiment, lighting system 103 is a light emitting diode (LED) lighting system. Other lighting systems may be used in farming system 100. For example, a high pressure sodium lighting system or a metal halide lighting system may be used.

In various embodiments, $CO_2$ system 110 of farming system 100 comprises a $CO_2$ tank and distribution tubes configured to disperse $CO_2$ into the surrounding air. In various embodiments, $CO_2$ system is suspended above growing station 101 to improve consumption by the plants. In various embodiments, $CO_2$ system 110 comprises a $CO_2$ generator powered by propane or natural gas, wherein the gasses are burned, and reacted with $O_2$ to generate $CO_2$. In various embodiments, $CO_2$ system 110 generates $CO_2$ by fermentation, for example, with sugar, water, and yeast. In various embodiments, $CO_2$ system 110 generates $CO_2$ in the absence of power and gas. In various embodiments, $CO_2$ system 110 is configured to operate on a timed cycle. In various embodiments, $CO_2$ system 110 is configured to generate and/or release $CO_2$ when $CO_2$ levels drop below a desired set point, and to turn off when the $CO_2$ levels increase to the desired set point.

In various embodiments, the hydroponics tank(s) and/or the aquaponics tank(s) of a nutrient supply system 102 are not configured to provide nutrients or nutrient dense water to fungi. In various embodiments, fungi are grown and/or vitally supported under low light and low heat conditions, and are not provided additional $CO_2$. In various embodiments, fungi are grown and/or vitally supported in a high humidity environment, (e.g. at or near 100% relative humidity, +/−10%). In various embodiments, plants and fungi are grown and/or vitally supported in separate growing stations 101. In various embodiments, plants are grown and/or vitally supported a plant chamber 111 and fungi are grown and/or vitally supported in a fungi chamber 112.

Figure 2A:
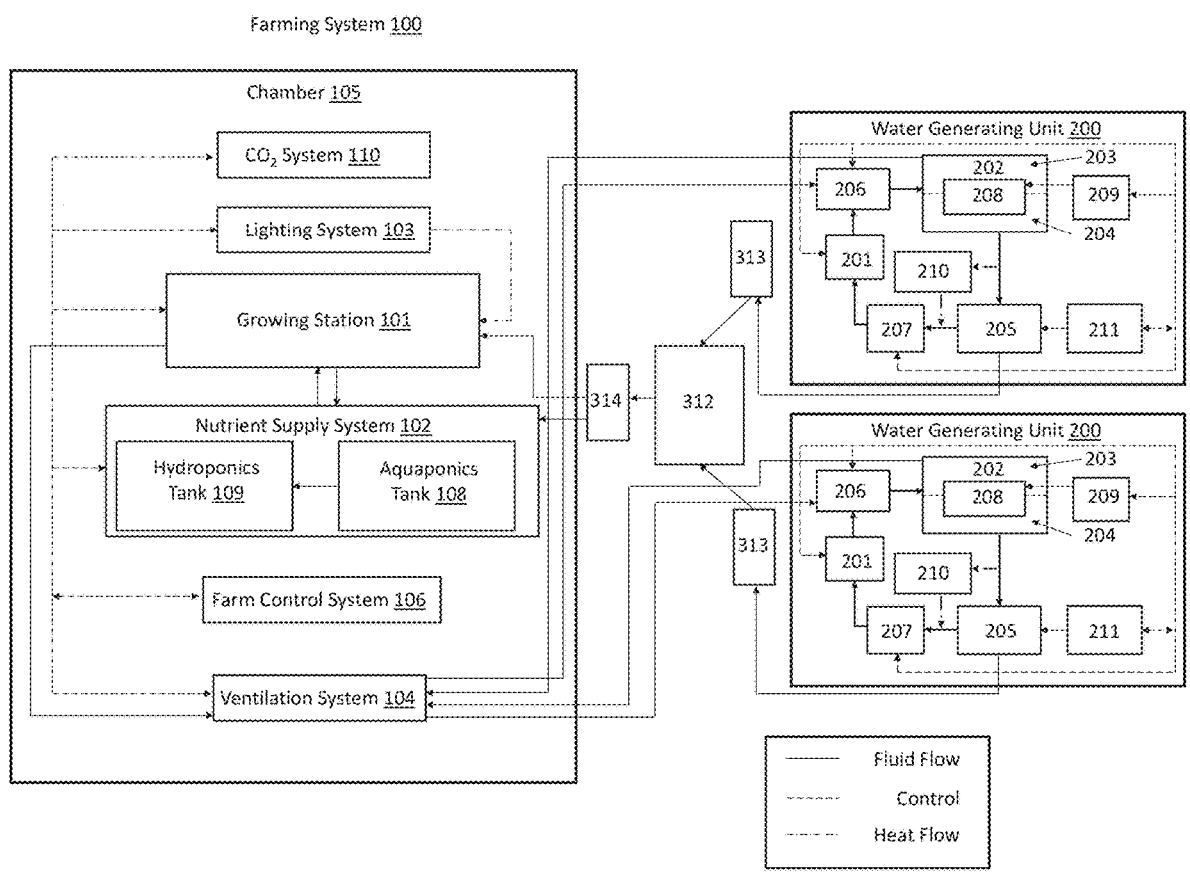
FIGS. 2a, 2b and 2c illustrate representative block diagrams of farming systems, according to various embodiments.
Figure 2B:
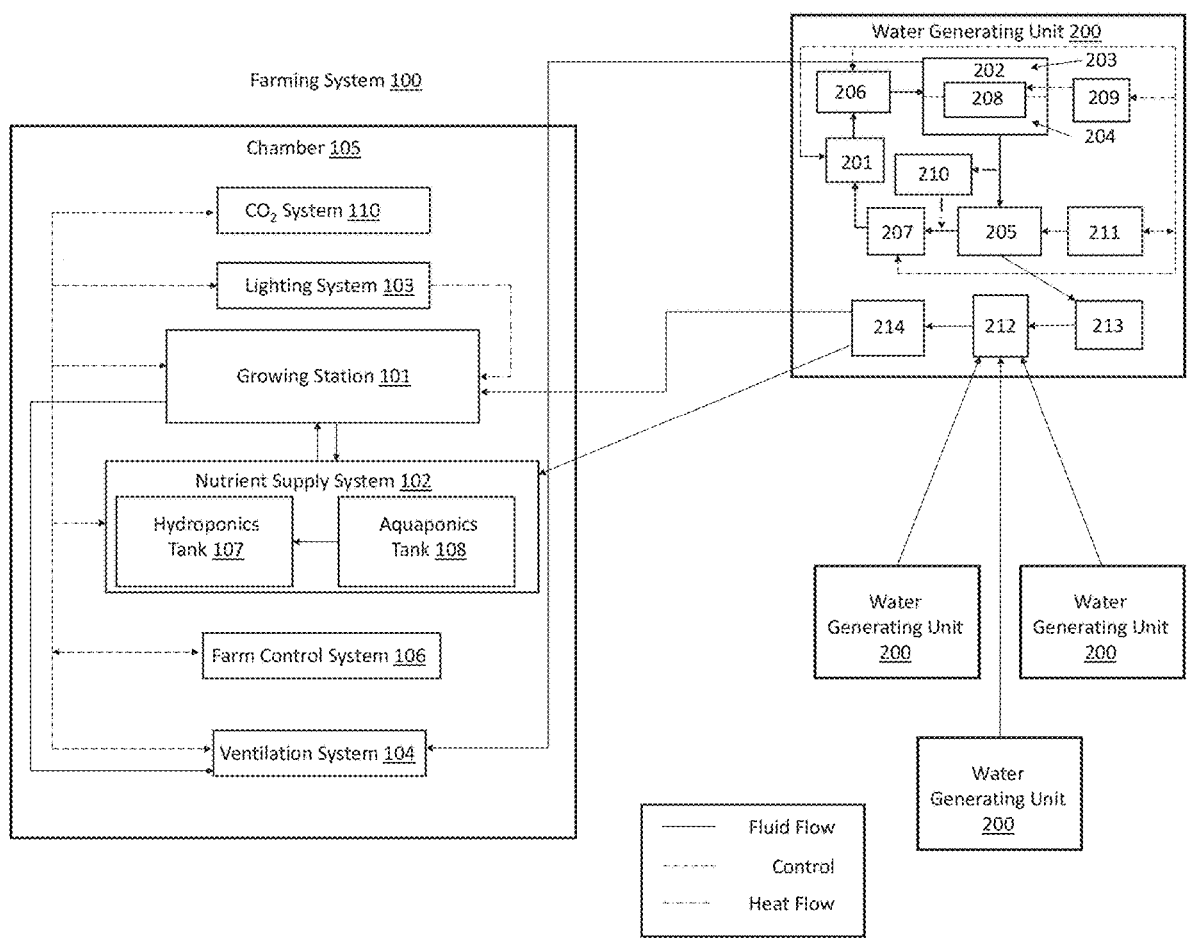
Figure 2C:
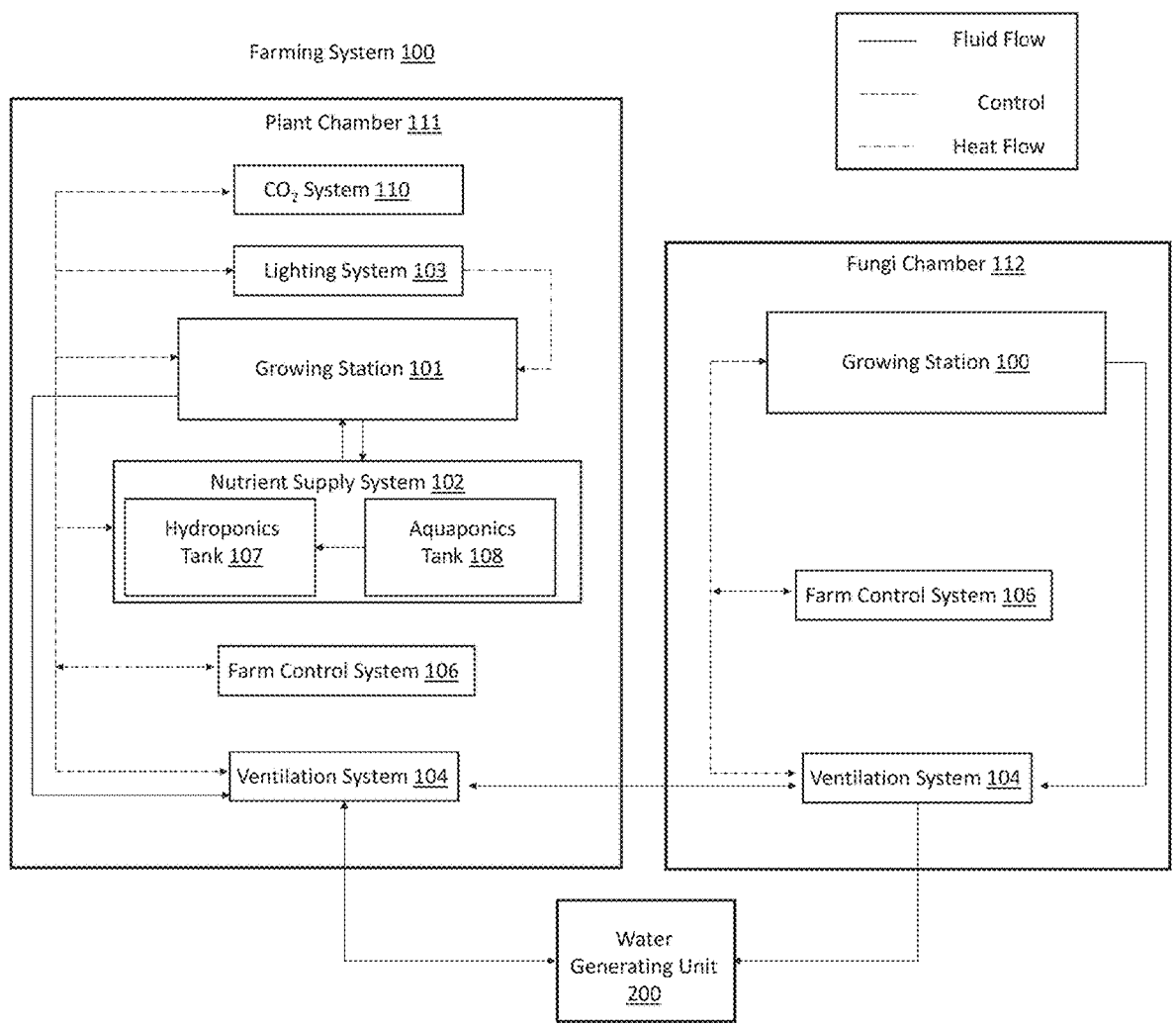

FIG. 2c illustrates an exemplary embodiment in which farming system 100 comprises a plant chamber 111 and a fungi chamber 112. Plant chamber 111 and/or fungi chamber 112 may share some or all of the features previously described with respect to chamber 105. In various embodiments, water generating system 200 is configured to provide water to both plant chamber 111 and a fungi chamber 112. In various embodiments, water generating system 200 is configured to receive part or all of the process fluid(s) from plant chamber 111. In various embodiments, ventilation systems 104 of plant chamber 111 and fungi chamber 112 are configured to exchange process fluid. For example, ventilation system 104 may be configured to receive process fluid(s) (e.g. oxygen ($O_2$)) from plant chamber 112 and transfer it to fungi chamber 112, and further configured to receive process fluid(s) (e.g. $CO_2$) from fungi chamber 112 and transfer it to plant chamber 111. In various embodiments, each of plant chamber 111 and fungi chamber 112 are configured to only receive process fluid(s) from the other chamber (e.g. in a closed loop). In various embodiments, plant chamber 111 is configured to receive additional $CO_2$ through $CO_2$ system 110. In various embodiments, fungi chamber 112 is configured to receive additional $O_2$ through the ventilation system from the atmosphere outside the fungi chamber 112 and/or from any other suitable source. In various embodiments, fungi chamber 112 further comprises one or more atomizers configured to aerosolize liquid water generated by water generating unit 200, thereby increasing relative humidity levels within the interior of the fungi chamber 112.

In various embodiments, water generating unit 200 can comprise a drinking water solar panel. A drinking water solar panel also can be referred to as a water-from-air solar panel or a solar powered atmospheric water generating hydropanel.

In various embodiments, water generating unit 200 comprises a heat generator 201, a desiccation device 202, a condenser 205, a blower 206, an actuator 209, and a circulator 207. Desiccation device 202 may comprise a housing defining an adsorption zone 203, a desorption zone 204, and a desiccant (e.g. sorption medium) 208.

In various embodiments, water generating unit 200 further comprises a condenser heat exchanger 210, a water generating unit control system 211, a water reservoir 212, a first filter 213, and/or a second filter 214. In other embodiments, condenser heat exchanger 210, water generating unit control system 211, water reservoir 212, first filter 213, and/or second filter 214 may be omitted.

In various embodiments, heat generator 201 is coupled to desiccation device 202. In various embodiments, desiccation device 202 is coupled to condenser 205. In various embodiments, condenser 205 is coupled to heat generator 201.

In various embodiments, circulator 207 is configured to receive one or more regeneration fluids and operably move and repeatedly cycle the regeneration fluid(s) from heat generator 201 to desiccation device 202 to condenser 205 and back to heat generator 201 (e.g., in a closed loop). In various embodiments, desiccation device 202, condenser 205, and heat generator 201 are coupled together by any suitable conduits configured to transfer the regeneration fluid(s) among desiccation device 202, condenser 205, and heat generator 201. Exemplary regeneration fluids may include humid air, one or more supersaturated or high relative humidity gases (e.g., a relative humidity greater than approximately 90%, one or more glycols, one or more ionic liquids, etc.).

Circulator 207 may comprise any suitable device configured to receive and move the regeneration fluid(s) from heat generator 201 to desiccation device 202 to condenser 205 and back to heat generator 201. For example, in various embodiments, circulator 207 comprises a pump.

In various embodiments, desiccation device 202 receives the regeneration fluid(s) at desorption zone 204. In various embodiments, after the regeneration fluid(s) are received at desorption zone 204, the regeneration fluid(s) is communicated to condenser 205. In some of these embodiments, the regeneration fluid(s) may be communicated to one or more additional desiccation devices 202 before being communicated to condenser 205, as explained further below.

In various embodiments, blower 206 is configured to receive one or more process fluids, and communicate the process fluid(s) to desiccation device 202. For example, in various embodiments, desiccation device 202 may receive the process fluid(s) at adsorption zone 203. Further, blower 206 may communicate the process fluid(s) through desiccation device 202 (e.g., through adsorption zone 203). In various embodiments, after the process fluid(s) are received at desiccation device 202 (e.g., at adsorption zone 203) the process fluid(s) is exhausted to the atmosphere around (e.g., adjacent to) water generating unit 200. As discussed in greater detail below, desiccation device 202 may cause water in the process fluid(s) to be desorbed into the regeneration fluid(s), and condenser 205 may condense the water in the regeneration fluid(s) into a liquid. Accordingly, in various embodiments, water generating unit 200 uses the process fluid(s) to generate water.

In various embodiments, when blower 206 is configured to receive multiple process fluids, blower 206 receives two or more of the multiple process fluids at the same time and/or at different times. For example, in various embodiments, one or more of the multiple process fluids received by blower 206 supplements one or more others of the multiple process fluids received by blower 206 when the one or more of the multiple process fluids received by blower 206 are received at a same time as the one or more others of the multiple process fluids received by blower 206.

Blower 206 may comprise any suitable device configured to receive the process fluid(s) and to move the process fluid(s) to desiccation device 202. For example, in various embodiments, blower 206 comprises a pump.

In various embodiments, the process fluid(s) comprises an atmospheric process fluid, i.e., ambient air. The ambient air may comprise humid air. The ambient air may be disposed inside chamber 105 and/or outside container farm 107. Blower 206 may receive the atmospheric process fluid from the atmosphere around (e.g., adjacent to, water generating unit 200).

In various embodiments, the process fluid(s) can comprise a farm process fluid (e.g., ambient air and/or humid air disposed within chamber 105 and into which plants and/or fungi transpire and/or respire, respectively). Blower 206 may be configured to receive the farm process fluid from chamber 105. For example, in these embodiments, blower 206 may be coupled to chamber 105 by any suitable conduits configured to transfer the farm process fluid from chamber 105 to blower 206.

In various embodiments, at least one or all of the process fluid(s) may be received by blower 206 without regulation. In other embodiments, at least some of the process fluid(s) are received by blower 206 under regulation, such as, for example, by one or more valves. The valve(s) may be manually operated. Alternatively or additionally, the valve(s) may be automatically operated, such as, for example, by water generating unit control system 211.

In various embodiments, actuator 209 is configured to operably move and repeatedly cycle desiccant 208, or portions thereof, between adsorption zone 203 and desorption zone 204 to capture (e.g., absorb and/or adsorb) water from the process fluid(s) received at adsorption zone 203 and desorb water into the regeneration fluid(s) received at desorption zone 204. For example, in various embodiments, desiccant 208 is disposed on a wheel located partially at adsorption zone 203 and partially at desorption zone 204. In these embodiments, portions of desiccant 208 may be simultaneously located at adsorption zone 203 and at desorption zone 204, such as, for example, so that desiccant 208 can simultaneously capture (e.g. absorb and/or adsorb) water from the process fluid received at adsorption zone 203 and desorb water into the regeneration fluid(s) received at desorption zone 204. Actuator 209 may operably rotate the wheel so that continuously changing portions of desiccant 208 are located at adsorption zone 203 and at desorption zone 204 when actuator 209 rotates the wheel.

In various embodiments, desiccant 208 comprises any suitable material or materials configured such that desiccant 208 can capture (e.g., absorb and/or adsorb) and desorb water. For example, the material(s) of desiccant 208 may comprise one or more hygroscopic materials. Exemplary material(s) for desiccant 208 may comprise one or more of: silica, silica gel, alumina, alumina gel, montmorillonite clay, one or more zeolites, one or more molecular sieves, activated carbon, one or more metal oxides, one or more lithium salts, one or more calcium salts, one or more potassium salts, one or more sodium salts, one or more magnesium 25 salts, one or more phosphoric salts, one or more organic salts, one or more metal salts, glycerin, one or more glycols, one or more hydrophilic polymers, one or more polyols, one or more polypropylene fibers, one or more cellulosic fibers, one or more derivatives thereof, and one or more combinations thereof.

In various embodiments, desiccant 208 comprises any suitable form or forms configured such that desiccant 208 may capture (e.g., absorb and/or adsorb) and desorb water. For example, desiccant 208 may comprise a liquid form and/or a solid form. In various embodiments, desiccant 208 comprises a porous solid impregnated with one or more hygroscopic material(s).

In various embodiments, desiccant 208 is configured to capture (e.g., absorb and/or adsorb) water at one or more temperatures and/or pressures. In various embodiments, desiccant 208 is configured to desorb water at one or more other temperatures and/or pressures. In various embodiments, desiccant 208 comprises various material(s) and/or form(s), and/or may be otherwise configured such that desiccant 208 does not capture (e.g., absorb and/or adsorb) one or more materials toxic to humans, pets, and/or other animals.

In various embodiments, condenser 205 is configured to extract water from the regeneration fluid(s) received at condenser 205, such as, for example, water that has been desorbed into the regeneration fluid(s) at desorption zone 204 of desiccation device 202. In these embodiments, condenser 205 may condense water vapor from the regeneration fluid(s) into liquid water. Accordingly, condenser 205 may cool the regeneration fluid(s) by extracting thermal energy from the regeneration fluid(s) in order to condense water vapor from the regeneration fluid(s) into liquid water. In various embodiments, condenser 205 transfers thermal energy extracted from the regeneration fluid(s) to the process fluid(s) upstream of desiccation device 202 and/or to the atmosphere around (e.g., adjacent to water generating unit 200).

In various embodiments, heat generator 201 is configured to provide thermal energy to the regeneration fluid(s) so that the regeneration fluid(s) are heated upon arriving at desiccation device 202. Exposing desiccant 208 of desiccation device 202 to the heated regeneration fluid(s) at desorption zone 204 of desiccation device 202 may regenerate desiccant 208 by causing water to desorb from desiccant 208 into the regeneration fluid(s), thereby permitting desiccant 208 to absorb more water from the process fluid(s) at adsorption zone 203 and permitting condenser 205 to condense into a liquid the water desorbed from desiccant 208 into the regeneration fluid(s).

For example, in order to provide thermal energy to the regeneration fluid(s), heat generator 201 may generate heat, receive the regeneration fluid(s), and transfer thermal energy from the heat to the regeneration fluid(s). Accordingly, water generating unit 200 may use the heat generated by heat generator 201 to generate water.

In various embodiments, heat generator 201 comprises a solar thermal heater (e.g., a solar thermal collector). In these embodiments, the solar thermal heater converts solar insolation to the thermal energy provided to the regeneration fluid(s).

Further, in various embodiments, heat generator 201 comprises a portion of one or more solar panels. In such embodiments, water generating unit 200 may comprise the solar panel(s). In various embodiments, the solar panel(s) comprise one or more photovoltaic cells configured to generate electricity. For example, the photovoltaic cell(s) may be configured to convert solar insolation into the electricity. In further embodiments, water generating unit 200 may use the electricity generated by the photovoltaic cell(s) to electrically power part or all of water generating unit 200. In these or other embodiments, part or all of water generating unit 200 may be electrically powered by any other suitable source of electricity.

In various embodiments, water reservoir 212 stores water extracted from the regeneration fluid(s) by condenser 205. Accordingly, water reservoir 212 may comprise any suitable receptacle or container configured to store water. Further, water reservoir 212 may be coupled to condenser 205 to receive the water extracted from the regeneration fluid(s) by condenser 205. For example, water reservoir 212 may be coupled to condenser 205 by any suitable conduits configured to transfer the water extracted from the regeneration fluid(s) by condenser 205 to water reservoir 212.

In various embodiments, water reservoir 212 is configured to mineralize water received from condenser 205. Water reservoir 212 may be configured to receive one or more additives for introduction to the produced liquid water. Such additives may be configured to dissolve slowly into liquid water stored in the water collection unit. Additives suitable for use in the present systems include, but are not limited to, minerals, salts, other compounds, and/or the like. To illustrate, such additives may be selected from the group consisting of: potassium salts, magnesium salts, calcium salts, fluoride salts, carbonate salts, iron salts, chloride salts, silica, limestone, and/or combinations thereof.

In various embodiments, water reservoir 212 is configured to sanitize water received from condenser 205. Water reservoir 212 may be configured to generate ozone and apply the ozone to water received from condenser 205. In various embodiments, ozone is generated by an ozone generator system as more fully described in Patent Publication No. WO/2019/014599.

In various embodiments, a first filter 213 is configured to filter water output by condenser 205, such as, for example, to remove one or more materials (e.g., one or more materials toxic to humans, pets, and/or other animals, from the water). Accordingly, first filter 213 may be coupled to an output of condenser 205, such as, for example, between condenser 205 and water reservoir 212. First filter 213 may comprise any suitable device configured to filter water. For example, first filter 213 may comprise a carbon filter and/or a stainless steel frit. First filter 213 may be configured to remove excess ozone from water.

In various embodiments, a second filter 214 is configured to filter water output by water reservoir 212, such as, for example, to remove one or more materials (e.g., one or more materials toxic to humans from the water). Accordingly, second filter 214 may be coupled to an output of water reservoir 212. Second filter 214 may comprise any suitable device configured to filter water. For example, second filter 214 may comprise a carbon filter and/or a stainless steel frit. In various embodiments, second filter 214 is omitted, such as, for example, when water reservoir 212 is omitted from farming system 100.

In various embodiments, condenser heat exchanger 210 is configured to transfer thermal energy from the regeneration fluid(s) upstream of condenser 205 to the regeneration fluid(s) downstream of condenser 205. For example, removing thermal energy from the regeneration fluid(s) upstream of condenser 205 may help prime or pre-cool the water vapor in the regeneration fluid(s) to be condensed into liquid water at condenser 205 by reducing the regeneration fluid(s)

to nearer to a temperature at which the water vapor will condense into liquid water. The thermal energy extracted from the regeneration fluid(s) by condenser heat exchanger 210 may be transferred to the regeneration fluid(s) downstream of condenser 205 so that the thermal energy can heat the regeneration fluid(s) upstream of desiccation device 202. In various embodiments, condenser heat exchanger 210 makes farming system 100 more efficient by making use of thermal energy in the regeneration fluid(s) that would otherwise be lost to condenser 205 to heat the regeneration fluid(s) heading to desiccation device 202.

In various embodiments, water generating unit control system 211 is configured to control one or more parts of water generating unit 200. For example, water generating unit control system 211 may control operation of blower 206, circulator 207 and/or actuator 209. In various embodiments, water generating unit control system 211 controls operation of condenser 205, such as, for example, when condenser 205 is implemented as an active device.

For example, in various embodiments, water generating unit control system 211 controls a speed (e.g., increases or decreases the speed) at which blower 206 communicates (e.g., pumps) the process fluid(s). Further, in these or other embodiments, water generating unit control system 211 may control a speed (e.g., increase or decrease the speed) at which circulator 207 communicates (e.g., pumps) the regeneration fluid(s). Further still, in these or other embodiments, water generating unit control system 211 may control a speed (e.g., increase or decrease the speed) at which actuator 209 moves (e.g., rotates) the desiccant 208.

In various embodiments, water generating unit control system 211 employs a control algorithm to control blower 206, circulator 207 and/or actuator 209, such as, for example, in a manner that maximizes the water generated by water generating unit 301 and/or minimizes electricity used by water generating unit 200 to generate water.

In various embodiments, the control algorithm determines (e.g., solve) optimal control conditions for blower 206, circulator 207 and/or actuator 209 as a function of (i) an ambient air temperature at water generating unit 200, (ii) an ambient air relative humidity at water generating unit 200, (iii) a temperature of a farm process fluid, (iv) a relative humidity of a farm process fluid, (v) a temperature of the heat generated by heat generator 201, and/or (vi) a rate of flow of the heat generated by heat generator 201. Further, the control algorithm controlling blower 206, circulator 207 and/or actuator 209 may determine (e.g., solve) optimal control conditions for blower 206, circulator 207 and/or actuator 209 relative to each other.

In various embodiments, water generating unit control system 211 communicates with one or more sensors (e.g., one or more water flow rate sensors) configured to detect the volume and/or rate of water generated by water generating unit 200. Detection of water flow rate by the one or more sensors may occur in real time.

In various embodiments, water generating unit control system 211 communicates with one or more sensors (e.g., one or more temperature sensors) configured to detect the ambient air temperature at water generating unit 200 in order to determine the ambient air temperature at water generating unit 200. Detection of ambient air temperature by the one or more sensors may occur in real time.

In various embodiments, water generating unit control system 211 communicates with one or more sensors (e.g., one or more humidity sensors) configured to detect the ambient air relative humidity at water generating unit 200 in order to determine the ambient air relative humidity at water generating unit 200. Detection of ambient air relative humidity by the one or more sensors may occur in real time.

In various embodiments, water generating unit control system 211 communicates with one or more sensors (e.g., one or more temperature sensors) configured to detect the temperature of the heat generated by heat generator 201 in order to determine the temperature of the heat generated by heat generator 201. Detection of heat by the one or more sensors may occur in real time.

In various embodiments, water generating unit control system 211 may communicate with one or more sensors (e.g., one or more heat rate of flow sensors) configured to detect the rate of flow of the heat generated by heat generator 201 in order to determine the rate of flow of the heat generated by heat generator 201. Detection of heat rate of flow by the one or more sensors may occur in real time.

For example, in various embodiments, water generating unit control system 211 may decrease the speed of actuator 209 as (a) the ambient air temperature at water generating unit 200, (b) the ambient air relative humidity at water generating unit 200, (c) the temperature of a farm process fluid, and/or (d) the relative humidity of a farm process fluid increases. Water generating unit control system 211 may decrease the speed of actuator 209 as (i) the temperature of the heat generated by heat generator 201 and/or (ii) the rate of flow of the heat generated by heat generator 201 decreases. In these or other embodiments, water generating unit control system 211 may increase the speed of actuator 209 as (a) the ambient air temperature at water generating unit 200, (b) the ambient air relative humidity at water generating unit 200, (c) the temperature of a farm process fluid, and/or (d) the relative humidity of a farm process fluid decreases. Water generating unit control system 211 may increase the speed of actuator 209 as (i) the temperature of the heat generated by heat generator 201 and/or (ii) the rate of flow of the heat generated by heat generator 201 increases.

In various embodiments, water generating unit control system 211 may increase the speed of blower 206 and/or circulator 207 as (a) the ambient air temperature at water generating unit 200, (b) the ambient air relative humidity at water generating unit 200, (c) the temperature of a farm process fluid, and/or (d) the relative humidity of a farm process fluid increases. Water generating unit control system 211 may increase the speed of blower 206 and/or circulator 207 as (i) the temperature of the heat generated by heat generator 201 and/or (ii) the rate of flow of the heat generated by heat generator 201 decreases. In these or other embodiments, water generating unit control system 211 may decrease the speed of circulator 207 as (a) the ambient air temperature at water generating unit 200, (b) the ambient air relative humidity at water generating unit 200, (c) the temperature of a farm process fluid, and/or (d) the relative humidity of a farm process fluid decreases. Water generating unit control system 211 may decrease the speed of blower 206 and/or circulator 207 as (i) the temperature of the heat generated by heat generator 201 and/or (ii) the rate of flow of the heat generated by heat generator 201 increases.

Water generating unit control system 211 may comprise any suitable device or devices configured to control one or more parts of water generating unit 200. For example, water generating unit control system 211 may comprise a computer system configured to control the one or more parts of water generating unit 200. Further, the computer system of water generating unit control system 211 may comprise one or more processors and one or more memory storage devices (e.g., one or more non-transitory memory storage devices).

In various embodiments, the processor(s) and/or the memory storage device(s) is similar or identical to the processor(s) and/or memory storage device(s) (e.g., non-transitory memory storage devices). In various embodiments, the computer system of water generating unit control system 211 comprises a single computer or server, but in other embodiments, the computer system of water generating unit control system 211 comprises a cluster or collection of computers or servers and/or a cloud of computers or servers. Further, various embodiments, the computer system of water generating unit control system 211 is implemented with a distributed network comprising a distributed memory architecture. The distributed memory architecture may reduce the impact on the distributed network and system resources to reduce congestion in bottlenecks while still allowing data to be accessible from a central location.

Further, water generating unit control system 211 may be electrically coupled to any parts of water generating unit 200 that water generating unit control system 211 is configured to control. For example, water generating unit control system 211 may be electrically coupled to one or more of heat generator 201, condenser 205, blower 206, circulator 207, actuator 209, one or more valve(s) of water generating unit 200, or any other portion of water generating unit 200. Further, water generating unit control system 211 may be electrically coupled to any sensor or sensors (e.g., one or more temperature sensors, one or more humidity sensors, one or more heat rate of flow sensors, etc.) from which water generating unit control system 211 obtains measurements. In various embodiments, the one or more of the sensor(s) may be disposed in or in communication with container farm 107, and may be configured to detect temperature, humidity, heat rate or flow, oxygen levels, carbon dioxide levels, nutrient levels, and/or any other relevant measurement. In various embodiments, one or more of the sensor(s) may be disposed in or in communication with water generating unit 200 and/or water generating unit control system 211.

In various embodiments, when controlling operation of water generating unit 200, water generating unit control system 211 is located remotely from where water generating unit 200 generates water. However, in other embodiments, when controlling operation of water generating unit 200, water generating unit control system 211 is located near to or at a location where water generating unit 200 generates water.

In various embodiments, one or more of the control algorithms employed by water generating unit control system 211 is deterministic. In other embodiments, one or more of the control algorithms employed by water generating unit control system 211 is adaptive through machine learning.

In various embodiments, the farming system 100 employs any one of the water generating units 200 as described and disclosed in U.S. Publication No. 2017/0354920 A1.

Although farming system 100 is described with respect to desiccation device 202, farming system 100 may be modified and implemented with one or more additional desiccation devices, which can be similar or identical to desiccation device 202. In these embodiments, desiccation device 202 and the additional desiccation device(s) may be implemented in series and/or in parallel with each other, as desired.

In various embodiments, container farm 107 may be coupled to water generating unit 200 by any suitable conduits configured to communicate fluids between container farm 107 and water generating unit 200, including without limitation, process fluid, farm process fluid, water generated by water generating unit 200, and/or water used by container farm 107. For example, in various embodiments, container farm 107 may be coupled (e.g., by the conduits) to condenser 205 and/or to water reservoir 212.

In various embodiments, chamber 105 provides a farm process fluid (e.g., humid air) to water generating unit 200, specifically to blower 206, to be used by water generating unit 200 to generate water. In various embodiments, the farm process fluid is generated and/or contributed to as a by-product of plant and/or fungi photosynthesis, transpiration, and/or respiration within chamber 105. Farm process fluid received by water generating unit 200 may be the only process fluid used by water generating unit 200 to generate water.

In various embodiments, container farm 107 may be coupled to water generating unit 200 by any suitable conduits configured to transfer the farm process fluid to water generating unit 200. For example, in various embodiments, container farm 107 is coupled (e.g., by the conduits) to blower 206.

In various embodiments, when farming system 100 is configured to use only water generated by water generating unit 200 to grow and/or vitally support the plants, fungi, and/or aquatic animals, and when water generating unit 200 is configured to use only the farm process fluid to generate water, water generating unit 200 and farming system 100 operates in a closed loop.

In various embodiments, ventilation system 104 of farming system 100 is configured to provide the farm process fluid to water generating unit 200. In various embodiments, some or all of the process fluid(s) exhausted by water generating unit 200 is received by the ventilation system 104 to be returned to the interior of chamber 105.

In various embodiments, container farm 107 is coupled to water generating unit 200 by any suitable conduits configured to communicate some or all of the process fluid(s) exhausted by water generating unit 200 to container farm 107. For example, in various embodiments, container farm 107, is in fluid communication with to desiccation device 202 via ventilation system 104 and any suitable conduits thereof, such that desiccation device 202 may receive part or all of the process fluid(s) exhausted by water generating unit 200 into chamber 105 via ventilation system 104.

In various embodiments, farming system 100 further comprises a farm control system 106 configured to control one or more parts of farming system 100. For example, in various embodiments, farm control system 106 is configured to control nutrient supply system 102, lighting system 103, $CO_2$ system 110 and/or ventilation system 104.

In various embodiments, farm control system 106 controls when nutrient supply system 102 makes nutrients available to growing station(s) 101. Further, farm control system 106 may control the quantity and/or frequency of nutrients that are added to nutrient depleted wanted and/or od water that is made available to growing station 101. For example, farm control system 106 may control when nutrient supply system 102 makes water available to growing station(s) 101 and/or how much water the nutrient supply system makes available to growing station(s) 101.

In various embodiments, farm control system 106 controls the frequency, timing, duration, intensity, and/or quality (e.g., wavelength) of light made available by lighting system 103 to the plants, fungi, and/or aquatic animals grown and/or vitally supported by farming system 100. Further, farm control system 106 may select and/or control a lighting cycle made available or displayed by container farm 107. As used herein, the term "lighting cycle" means an optionally repeatable series of lighting characteristics, which may vary the frequency, timing, duration, intensity, and/or quality (e.g., wavelength) of light made available by lighting system 103 to the plants, fungi, and/or aquatic animals grown and/or vitally supported by farming system 100.

In various embodiments, farm control system 106 controls when ventilation system 104 makes farm process fluid available to water generating unit 200. Further, farm control system 106 may control the quantity of flow rate of farm process fluid provide by ventilation system 104 to water generating unit 200.

In various embodiments, farm control system 106 controls when container farm 107 receives water from water generating unit 200, the flow rate of water received by water generating unit 200, and/or a quantity of water that container farm 107 receives from water generating unit 200.

In various embodiments, farm control system 106 controls when container farm 107 receives $CO_2$ from $CO_2$ system 110, the flow rate of $CO_2$ received by water generating unit 200, and/or a quantity of $CO_2$ that container farm 107 receives from $CO_2$ system 110.

For example, in various embodiments, farm control system 106 monitors and/or controls a temperature of the interior of the chamber 105, a relative humidity of the interior of the chamber 105, a water total dissolved solids (TDS)/parts per million (PPM) value of the water made available to the plants, fungi, and/or aquatic animals grown and/or vitally supported by the farming system 100, a potential of Hydrogen (pH) value of the water made available to the plants, fungi, and/or aquatic animals grown and/or vitally supported by the farming system 100, and/or a lighting cycle of the light provided to the plants, fungi, and/or aquatic animals grown or vitally supported by the farming system 100. In various embodiments, farm control system 106 of farming system 100 collects and/or provides data (e.g., a temperature of the interior of chamber 105, a relative humidity of the interior of chamber 105, a water total dissolved solids (TDS)/parts per million (PPM) value of the water made available to the plants, fungi, and/or aquatic animals grown and/or vitally supported by farming system 100, a potential of Hydrogen (pH) value of the water made available to the plants, fungi, and/or aquatic animals grown and/or vitally supported by farming system 100, etc.) to an operator, user, and/or observer of farming system 100. In further embodiments, farm control system 106 provides alerts to an operator, user, and/or observer of farming system 100 when data collected by farm control system 106 is irregular and/or outside of predetermined parameters.

In various embodiments, farm control system 106 communicates with one or more sensors (e.g., one or more temperature sensors) configured to detect the temperature of the interior of chamber 105 in order to determine the temperature of the interior of chamber 105. Detection of temperature by the one or more sensors may occur in real time.

In various embodiments, farm control system 106 may communicate with one or more sensors (e.g., one or more humidity sensors) configured to detect the relative humidity of the interior of chamber 105 in order to determine the relative humidity of the interior of chamber 105. Detection of humidity by the one or more sensors may occur in real time.

In various embodiments, farm control system 106 may communicate with one or more sensors (e.g., one or more $CO_2$ sensors) configured to detect the relative $CO_2$ levels of the interior of chamber 105 in order to determine the relative $CO_2$ levels of the interior of chamber 105. Detection of relative $CO_2$ levels by the one or more sensors may occur in real time.

In various embodiments, farm control system 106 may communicate with one or more sensors (e.g., one or more total dissolved solids/parts per million sensors) configured to detect the water total dissolved solids (TDS)/parts per million (PPM) value of the water made available to the plants, fungi, and/or aquatic animals grown and/or vitally supported by the farming system 100 in order to determine the water total dissolved solids (TDS)/parts per million (PPM) value of the water made available to the plants, fungi, and/or aquatic animals grown and/or vitally supported by the farming system 100. Detection of a water total dissolved solids (TDS)/parts per million (PPM) value by the one or more sensors may occur in real time.

In various embodiments, farm control system 106 may communicate with one or more sensors (e.g., one or more potential of Hydrogen (pH) sensors) configured to detect the potential of Hydrogen (pH) value of the water made available to the plants, fungi, and/or aquatic animals grown and/or vitally supported by the farming system 100 in order to determine the potential of Hydrogen (pH) value of the water made available to the plants, fungi, and/or aquatic animals grown and/or vitally supported by the farming system 100. Detection of pH value by the one or more sensors may occur in real time.

In various embodiments, farm control system 106 may communicate with one or more sensors configured to detect the amount of light, water levels, water flow rate, and/or temperature of the water made available to the plants, fungi, and/or aquatic animals grown and/or vitally supported by the farming system 100. Detection of light, water levels, water flow rate, and water temperature may occur in real time.

In various embodiments, the farm control system 106 comprises any suitable device or devices configured to control one or more parts of farming system 100. For example, the farm control system 106 may comprise a computer system configured to control the one or more parts of farm control system 106. Further, the computer system of the farm control system 106 may comprise one or more processors and one or more memory storage devices (e.g., one or more non-transitory memory storage devices). In various embodiments, the computer system of farm control system 106 comprises a single computer or server, but in other embodiments, the computer system of the farm control system 106 comprises a cluster or collection of computers or servers and/or a cloud of computers or servers. Further, in these or other embodiments, the computer system of the farm control system 106 is implemented with a distributed network comprising a distributed memory architecture. The distributed memory architecture may reduce the impact on the distributed network and system resources to reduce congestion in bottlenecks while still allowing data to be accessible from a central location.

Further, farm control system 106 may be electrically coupled to any parts of farming system 100 that farm control system 106 is configured to control. For example, farm control system 106 may be electrically coupled to nutrient supply system 102, lighting system 103, and/or ventilation system 104, etc. Further, water generating unit control system 211 may be electrically coupled to any sensor or sensors (e.g., one or more temperature sensors, one or more humidity sensors, one or more total dissolved solids/parts per million sensors, one or more of potential of Hydrogen (pH) sensors, etc.) from which water generating unit control system 211 obtains measurements. In various embodiments, one or more of the sensor(s) may comprise a part of container farm 107, water generating unit 200 and/or farming system 100.

In various embodiments, farm control system 106 comprises a part of water generating unit control system 211. In other embodiments, the farm control system 106 is separate from water generating unit control system 211.

Although farming system 100 is described with respect to one water generating unit (i.e., water generating unit 200), farming system 100 may be modified and implemented with one or more additional water generating units, which can be similar or identical to water generating unit 200. In these embodiments, the additional water generating units also can make available water to container farm 107. Further, in various embodiments, one or more of water generating unit 200 and the additional water generating units may be configured to use the farm process fluid to generate water, and one or more of water generating unit 200 and the additional water generating units can use the process fluid disposed outside chamber 105 to generate water. In these embodiments, use of the farm process fluid by water generating unit 200 and the additional water generating units may be controlled by the farm control system 106 to maintain a relative humidity within chamber 105.

FIG. 2a illustrates an exemplary embodiment of a farming system 100 implemented with two water generating units. In various embodiments, water is generated independently by each water generating unit 200, but is commingled thereafter. The commingled water may be passed through a first filter 313. The commingled water may be collected in a single water reservoir 312. The commingled water may be passed through second filter 314 before being communicated to container farm 107.

FIG. 2b illustrates an exemplary embodiment of a farming system 100 implemented with four water generating units. In various embodiments, water is generated independently by each water generating unit 200, and is thereafter communicated to, and commingled in, water reservoir 212 of a single water generating unit 200. The commingled water may then be communicated to container farm 107. It will be appreciated by those skilled in the art that any number of water generating units may be used in farming system 100, and that water generated by multiple water generating units may, or may not, be commingled at any suitable point prior to communication to container farm 107.

Various embodiments include a method of providing (e.g., manufacturing) a farming system. Various embodiments include a method of using a farming system. The farming system can be similar or identical to farming system 100 (FIG. 1).

Figure 3:
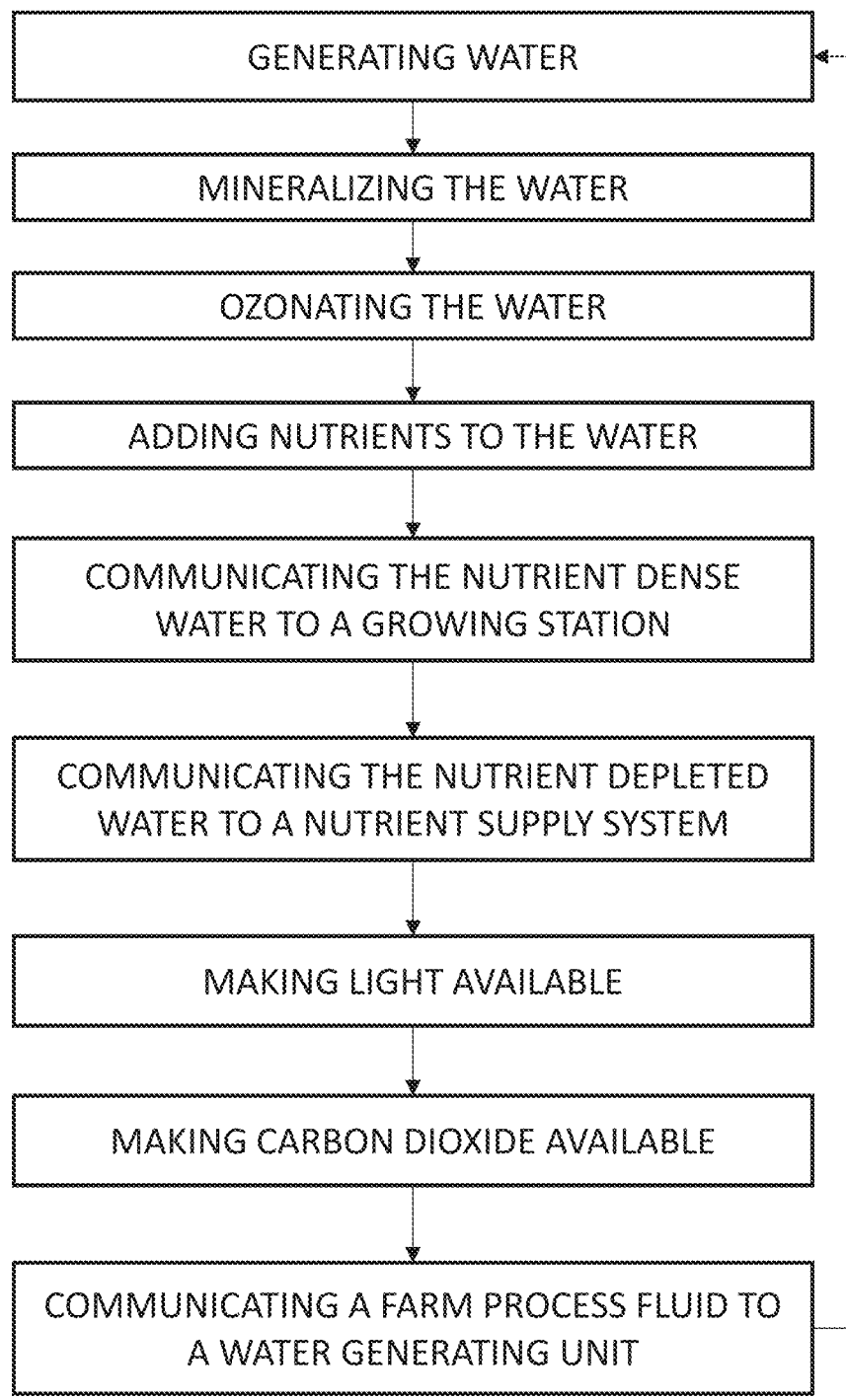
FIG. 3 illustrates a flow chart outlining a method of using a farming system, according to an embodiment.

FIG. 3 is a flow chart of a non-limiting example of a method of using farming system 100 as described herein. In various embodiments, the method of using farming system 100 comprises generating water by water generating unit 200. In various embodiments, the method of using farming system 100 comprises at least one of mineralizing the water generated by water generating unit 200 and ozonating the water generated by water generating unit 200. In various embodiments, the method of using farming system 100 comprises adding nutrients, by nutrient supply system 102 to water generated by water generating unit 200 to produce nutrient dense water. In various embodiments, the method of using farming system 100 comprises communicating the nutrient dense water to a growing station 101. Nutrient dense water may become depleted of nutrients after contacting plants and/or fungi at growing station 101. In various embodiments, the method of using farming system 100 comprises communicating nutrient depleted water from growing station 101 to nutrient supply system 102. In various embodiments, the method of using farming system 100 comprises providing and/or making available light by a lighting system 103. In various embodiments, the method of using farming system 100 comprises providing and/or making available carbon dioxide to chamber 105 by a $CO_2$ system 110. In various embodiments, the method of using farming system 100 comprises communicating, by ventilation system 104, a farm process fluid to water generating unit 200. In various embodiments, the method of using farming system 100 comprises repeating one or more of the steps including generating water, mineralizing water, ozonating water, adding nutrients, communicating nutrient dense water, communicating nutrient depleted water, making light available, making carbon dioxide available, and communicating a farm process fluid.

Figure 4:
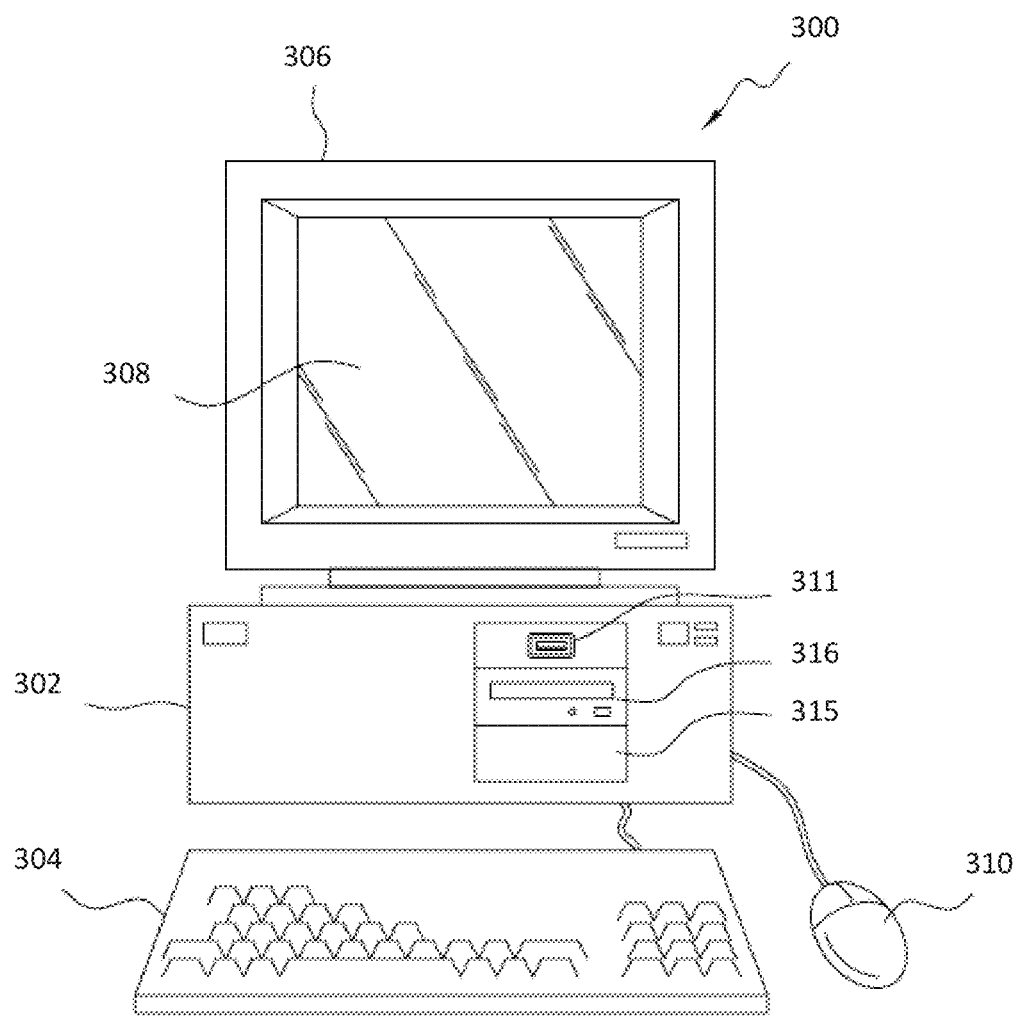
FIG. 4 illustrates a front elevational view of an exemplary computer system that is suitable to implement at least part of a water generating unit control system and farm control system of the farming systems described herein, and/or to implement one or more of the methods described herein, according to an embodiment.
Figure 5:
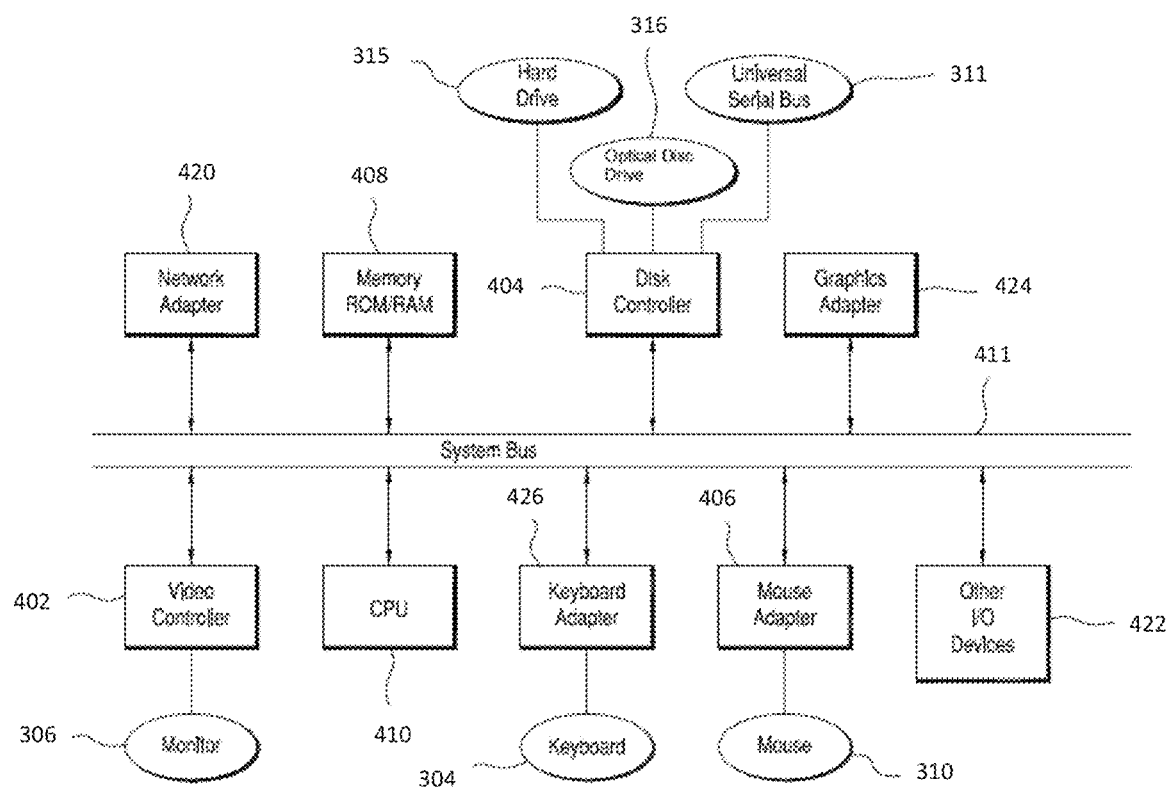
FIG. 5 illustrates a representative block diagram of exemplary elements included on the circuit boards inside a chassis of the computer system of FIG. 4, according to an embodiment.

FIGS. 4 and 5 illustrates exemplary embodiments of a computer system 300, all of which or a portion of which can be suitable for (i) implementing part or all of one or more embodiments of the techniques, methods, and systems and/or (ii) implementing and/or operating part or all of one or more embodiments of the memory storage devices described herein.

For example, in some embodiments, all or a portion of computer system 300 can be suitable for implementing part or all of one or more embodiments of the techniques, methods, and/or systems described herein. In various embodiments, farm control system 106 comprises computer system 300. In various embodiments, water generating unit control system 211 comprises computer system 300. Furthermore, one or more elements of computer system 300 (e.g., a refreshing monitor 306, a keyboard 304, and/or a mouse 310, etc.) also can be appropriate for implementing part or all of one or more embodiments of the techniques, methods, and/or systems described herein.

In many embodiments, computer system 300 can comprise chassis 302 containing one or more circuit boards (not shown), a Universal Serial Bus (USB) port 311, a hard drive 315, and an optical disc drive 316. Meanwhile, for example, optical disc drive 316 can comprise a Compact Disc Read-Only Memory (CD-ROM), a Digital Video Disc (DVD) drive, or a Blu-ray drive. Still, in other embodiments, a different or separate one of a chassis 302 (and its internal components) can be suitable for implementing part or all of one or more embodiments of the techniques, methods, and/or systems described herein.

In various embodiments, computer system 300 is configured to receive data from one or more sensors of farming system 100, calculate a value from the received data, compare the value to a predetermined threshold, and control a component of farming system 300 in response to the comparison. For example, a processor of computer system 300 may be configured to instruct $CO_2$ system 110 to release $CO_2$ in response to detecting a $CO_2$ concentration below a predetermined threshold value. A processor of computer system 300 may be configured to instruct ventilation system 104 to communicate farm process fluid in response to an $O_2$ concentration above a predetermined threshold value. A processor of computer system 300 may be configured to instruct ventilation system 104 to communicate farm process fluid in response to an air temperature above a predetermined threshold value. A processor of computer system 300 may be configured to instruct ventilation system 104 to communicate farm process fluid in response to a relative humidity above a predetermined threshold value. A processor of computer system 300 may be configured to instruct ventilation system 104 to communicate farm process fluid in response to a $CO_2$ concentration below a predetermined threshold value. A processor of computer system 300 may be configured to instruct a nutrient supply system 102 to communicate nutrients in response to a nutrient concentration below a predetermined threshold value. A processor of computer system 300 may be configured to instruct nutrient supply system 102 to communicate nutrient dense water in response to nutrient concentration below a predetermined threshold value. A processor of computer system 300 may be configured to instruct nutrient supply system 102 to communicate nutrient dense water in response to nutrient concentration above a predetermined threshold value. A processor of computer system 300 may be configured to instruct an atomizer to aerosolize water in response to a relative humidity below a predetermined threshold value. A processor of computer system 300 may be configured to instruct farming system 100 to communicate water in response to a pressure below a predetermined threshold value.

Turning ahead in the drawings, FIG. 5 illustrates a representative block diagram of exemplary elements included on the circuit boards inside chassis 302 (FIG. 4). For example, a central processing unit (CPU) 410 is coupled to a system bus 411. In various embodiments, the architecture of CPU 410 can be compliant with any of a variety of commercially distributed architecture families.

In many embodiments, system bus 411 also is coupled to a memory storage unit 408, where memory storage unit 408 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 408 can comprise (i) non-transitory memory and/or (ii) transitory memory.

The memory storage device(s) of the various embodiments disclosed herein can comprise memory storage unit 408, an external memory storage drive (not shown), such as, for example, a USB-equipped electronic memory storage drive coupled to universal serial bus (USB) port 311 (FIGS. 4 & 5), hard drive 315 (FIGS. 4 & 5), optical disc drive 316 (FIGS. 4 & 5), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 300 (FIG. 4) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 300 (FIG. 4). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 410.

In the depicted embodiment of FIG. 5, various I/O devices such as a disk controller 404, a graphics adapter 424, a video controller 402, a keyboard adapter 426, a mouse adapter 406, a network adapter 420, and other I/O devices 422 can be coupled to system bus 411. Keyboard adapter 426 and mouse adapter 406 are coupled to keyboard 304 (FIGS. 4 & 5) and mouse 310 (FIGS. 4 & 5), respectively, of computer system 300 (FIG. 4). While graphics adapter 424 and video controller 402 are indicated as distinct units in FIG. 5, video controller 402 can be integrated into graphics adapter 424, or vice versa in other embodiments. Video controller 402 is suitable for refreshing monitor 306 (FIGS. 4 & 5) to display images on a screen 308 (FIG. 4) of computer system 300 (FIG. 4). Disk controller 404 can control hard drive 315 (FIGS. 4 & 5), USB port 311 (FIGS. 4 & 5), and optical disc drive 316 (FIGS. 4 & 5). In other embodiments, distinct units can be used to control each of these devices separately.

Network adapter 420 can be suitable to connect computer system 300 (FIG. 4) to a computer network by wired communication (e.g., a wired network adapter) and/or wireless communication (e.g., a wireless network adapter). In some embodiments, network adapter 420 can be plugged or coupled to an expansion port (not shown) in computer system 300 (FIG. 4). In other embodiments, network adapter 420 can be built into computer system 300 (FIG. 4). For example, network adapter 420 can be built into computer system 300 (FIG. 4) by being integrated into the motherboard chipset (not shown), or implemented via one or more dedicated communication chips (not shown), connected through a PCI (peripheral component interconnector) or a PCI express bus of computer system 300 (FIG. 4) or USB port 311 (FIG. 4).

Returning now to FIG. 4, although many other components of computer system 300 are not shown, such components and their interconnection are well known to those of ordinary skill in the art. Accordingly, further details concerning the construction and composition of computer system 300 and the circuit boards inside chassis 302 are not discussed herein.

Meanwhile, when computer system 300 is running, program instructions (e.g., computer instructions) stored on one or more of the memory storage device(s) of the various embodiments disclosed herein can be executed by CPU 410 (FIG. 5). At least a portion of the program instructions, stored on these devices, can be suitable for carrying out at least part of the techniques, methods, and activities of the methods described herein. In various embodiments, computer system 300 can be reprogrammed with one or more systems, applications, and/or databases to convert computer system 300 from a general purpose computer to a special purpose computer.

Further, although computer system 300 is illustrated as a desktop computer in FIG. 4, computer system 300 can have a different form factor while still having functional elements similar to those described for computer system 300. In some embodiments, computer system 300 may comprise a single computer, a single server, or a cluster or collection of computers or servers, or a cloud of computers or servers. Typically, a cluster or collection of servers can be used when the demand on computer system 300 exceeds the reasonable capability of a single server or computer. In certain embodiments, computer system 300 may comprise an embedded system.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within farming system 100 (FIG. 1) can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A farming system comprising:
    a growing station configured to grow or vitally support at least one of plants and fungi;
    a nutrient supply system in fluid communication with, and configured to supply nutrients to, the growing station; and
    a lighting system configured to make light available to the at least one of plants and fungi;
    wherein at least a portion of the farming system is contained within a chamber,
    a water generating unit comprising:
        a desiccation device comprising a housing defining an adsorption zone and a desorption zone, and a desiccant;
        a heat generator coupled to the desiccation device;
        a condenser coupled to the desiccation device and to the heat generator;
        a blower configured to receive a process fluid and move the process fluid to the adsorption zone of the desiccation device, the blower being coupled to the chamber by a conduit configured to transfer the farm process fluid from the chamber to the blower;
        a circulator configured to receive a regeneration fluid and operably move and repeatedly cycle the regeneration fluid from the heat generator to the desorption zone of the desiccation device to the condenser, and back to the heat generator; and
        an actuator configured to operably move and repeatedly cycle the desiccant, or portions thereof, between the adsorption zone and desorption zone to capture water from the process fluid received at the adsorption zone and desorb water into the regeneration fluid received at the desorption zone;
    a ventilation system configured to provide a farm process fluid comprising air from the interior of the chamber to the blower of the water generating unit via the conduit; and,
    a control system configured to control when the ventilation system makes the farm process fluid available to the water generating unit via the conduit;
    wherein the process fluid comprises a farm process fluid received from the interior of the chamber, and,
    wherein the growing station is in fluid communication with the water generating unit configured to generate water from air of the farm process fluid disposed inside the chamber.

2. The farming system of claim 1, wherein the growing station comprises at least one of vertically and horizontally stacked nutrient film technique (NFT) channels configured to receive nutrient dense water from the nutrient supply system and distribute the nutrient dense water to the at least one of plants and fungi.

3. The farming system of claim 2, wherein the NFT channels are further configured to distribute nutrient depleted water to the nutrient supply system.

4. The farming system of claim 1, wherein the nutrient supply system comprises at least one of an aquaponics tank and a hydroponics tank, wherein at least a portion of the water held by the aquaponics tank and the hydroponics tank is generated by, and received from, the water generating unit.

5. The farming system of claim 4, wherein the aquaponics tank is configured to grow or vitally support aquatic animals, and wherein at least a portion of the nutrients are produced by the aquatic animals.

6. The farming system of claim 4, wherein the nutrient supply system further comprises one or more nutrient reservoirs configured to hold one or more nutrients and to provide the one or more nutrients to at least one of the aquaponics tank and the hydroponics tank.

7. The farming system of claim 6, further comprising at least one of a bio filter and a vortex solids filter configured to filter the water provided by the aquaponics tank.

8. The farming system of claim 1, wherein water generated by the water generating unit is the only water used to grow or vitally support the plants and fungi.

9. The farming system of claim 1, wherein the water generating unit is configured to use only the farm process fluid to generate water.

10. The farming system of claim 1, wherein the ventilation system is configured to receive all of or a portion of the process fluid exhausted by the water generating unit and return it to the farming system.

11. The farming system of claim 1, wherein the control system is configured to control one or more of: a speed at which the blower moves the process fluids, a speed at which the circulator moves the regeneration fluid, and a speed at which the actuator moves the desiccant element.

12. The farming system of claim 11, wherein the control system communicates with one or more sensors configured to detect one or more of: an ambient air temperature at the water generating unit, an ambient air relative humidity at the water generating unit, a temperature of the heat generated by the heat generator, a rate of flow of the heat generated by the heat generator, and a relative humidity of the farm process fluid.

13. The farming system of claim 11, wherein the control system employs a control algorithm configured to determine optimal control conditions for the blower, the circulator, and the actuator as a function of one or more of an ambient air temperature at the water generating unit, a temperature of the farm process fluid, a relative humidity of the farm process fluid, a temperature of the heat generated by the heat generator, and a rate of flow of the heat generated by the heat generator.

14. The farming system of claim 1, further comprising a farm control system configured to control at least one of the nutrient supply system, the lighting system, and the ventilation system.

15. A farming system comprising:
a growing station configured to grow or vitally support at least one of plants and fungi;
a nutrient supply system in fluid communication with, and configured to supply nutrients to, the growing station; and
a lighting system configured to make light available to the at least one of plants and fungi;
wherein at least a portion of the farming system is contained within a chamber,
a water generating unit comprising:
a desiccation device comprising a housing defining an adsorption zone and a desorption zone, and a desiccant;
a heat generator coupled to the desiccation device;
a condenser coupled to the desiccation device and to the heat generator;
a blower configured to receive a process fluid and move the process fluid to the adsorption zone of the desiccation device, the blower being coupled to the chamber by a conduit configured to transfer the farm process fluid from the chamber to the blower;
a circulator configured to receive a regeneration fluid and operably move and repeatedly cycle the regeneration fluid from the heat generator to the desorption zone of the desiccation device to the condenser, and back to the heat generator; and
an actuator configured to operably move and repeatedly cycle the desiccant, or portions thereof, between the adsorption zone and desorption zone to capture water from the process fluid received at the adsorption zone and desorb water into the regeneration fluid received at the desorption zone;
a ventilation system configured to provide a farm process fluid comprising air from the interior of the chamber to the blower of the water generating unit via the conduit and,
a control system configured to control when the ventilation system makes the farm process fluid available to the water generating unit via the conduit;
wherein the process fluid comprises a farm process fluid received from the interior of the chamber;
wherein the growing station is in fluid communication with the water generating unit configured to generate water from air of the farm process fluid disposed inside the chamber;
wherein the control system controls when the growing station receives water from the water generating unit, and a quantity of water received by the growing station from the water generating unit.

16. The farming system of claim 1, wherein the control system is configured to monitor and control at least one of an ambient air temperature of the interior of the chamber, an ambient air relative humidity of the interior of the chamber, a water total dissolved solids (TDS)/parts per million (PPM) value of the water made available to the growing station, a potential of hydrogen (pH) value of the water made available to the growing station, and a lighting cycle of the light provided by the lighting system to the growing station.

17. The farming system of claim 1, wherein the chamber comprises:
a fungi chamber configured to grow or vitally support fungi, and
a plant chamber configured to grow or vitally support plants,
wherein an environment within the fungi chamber and an environment within the plant chamber are at least partially separated, the fungi chamber having a high humidity environment;
wherein the nutrient supply system is configured to provide nutrients or nutrient dense water to the plant chamber and is not configured to provide nutrients or nutrient dense water to the fungi chamber.

18. The farming system of claim 17, wherein the process fluid exhausted by the water generating unit is returned to the plant chamber of the farming system, and wherein the ventilation system is further configured to transfer at least some of the $CO_2$ generated by respiration of the fungi to the plant chamber, and to transfer at least some of the $O_2$ generated by transpiration of the plants to the fungi chamber.

19. A farming system comprising:
a first water generating unit comprising:
a desiccation device;
a heat generator coupled to the desiccation device;
a condenser coupled to the desiccation device and to the heat generator;

a blower configured to receive a process fluid and move the process fluid to the desiccation device to capture water from the process fluid; and, a circulator configured to receive a regeneration fluid and repeatedly cycle the regeneration fluid from the heat generator to the desiccation device to desorb water into the regeneration fluid, and to the condenser to extract water from the regeneration fluid, and back to the heat generator;

a chamber comprising:
- a growing station configured to grow or vitally support at least one of plants and fungi;
- a nutrient supply system in fluid communication with, and configured to supply nutrients to the growing station; and
- a lighting system configured to make light available to the at least one of plants and fungi;
- a ventilation system configured to provide at least a portion of a farm process fluid from the interior of the chamber to the blower of the water generating unit via a conduit; and,
- a control system configured to control when the ventilation system makes at least a portion of the farm process fluid available to the first water generating unit via the conduit to generate water from air disposed inside the chamber;

wherein the process fluid comprises a farm process fluid received from the interior of the chamber; and, wherein the water generating unit is configured to generate water from air of the farm process fluid disposed inside the chamber.

20. The farming system of claim 19, wherein the control system is configured to adjust the speed of the blower in response to a change in one or more of: the ambient air temperature at the water generating unit; the ambient air relative humidity at the water generating unit; the temperature of the farm process fluid; the relative humidity of the farm process fluid; the temperature of the heat generated by the heat generator; and, the rate of flow of heat generated by heat generator.

21. The farming system of claim 19, further comprising a second water generating unit comprising:
- a desiccation device;
- a heat generator coupled to the desiccation device;
- a condenser coupled to the desiccation device and to the heat generator;
- a blower configured to receive multiple process fluids and move the process fluid to the desiccation device to capture water from the process fluid; and,
- a circulator configured to receive a regeneration fluid and repeatedly cycle the regeneration fluid from the heat generator to the desiccation device to desorb water into the regeneration fluid and to the condenser to extract water from the regeneration fluid and back to the heat generator;

wherein the control system is further configured to control when the ventilation system makes at least a portion of the farm process fluid available to the second water generating unit to generate water from the farm process fluid disposed inside the chamber;

wherein the blower is configured to receive multiple process fluids; and wherein water is generated from the farm process fluid independently by each of the first and second water generating units.

* * * * *